United States Patent [19]

Ha-Duong

[11] Patent Number: 5,768,270
[45] Date of Patent: Jun. 16, 1998

[54] ATM SWITCH USING SYNCHRONOUS SWITCHING BY GROUPS OF LINES

[75] Inventor: Tuan Ha-Duong, Antony, France

[73] Assignee: FIHEM, Paris, France

[21] Appl. No.: 618,764

[22] Filed: Mar. 20, 1996

[30] Foreign Application Priority Data

Mar. 27, 1995 [FR] France ............................. 95 03560

[51] Int. Cl.$^6$ .................................................. H04L 12/56
[52] U.S. Cl. ......................... 370/388; 370/390; 370/395; 370/434
[58] Field of Search ...................... 370/357, 388, 370/389, 395, 398, 399, 390, 434

[56] References Cited

U.S. PATENT DOCUMENTS

| | | |
|---|---|---|
| 5,124,978 | 6/1992 | Chao . |
| 5,237,565 | 8/1993 | Henrion et al. ............... 370/388 |
| 5,285,444 | 2/1994 | Sakurai et al. ............... 370/395 |
| 5,367,520 | 11/1994 | Cordell ........................ 370/395 |
| 5,555,243 | 9/1996 | Kakuma et al. .............. 370/388 |

FOREIGN PATENT DOCUMENTS

| | | |
|---|---|---|
| 0 323 835 | 7/1989 | European Pat. Off. . |
| 0 446 493 | 9/1991 | European Pat. Off. . |
| 0 524 350 | 1/1993 | European Pat. Off. . |

OTHER PUBLICATIONS

GLOBECOM'90 IEEE Global Telecommunications Conference & Exhibition—San Diego, California—Dec. 2–5, 1990—"KSMINs: Knockout Switch Based Multistage Inteconnection Networks for High–Speed Packet Switching"—Young Man Kim and Kyungsook Y. Lee.—pp. 0218–0223.

IEEE Transactions of Communications, vol. 40, N°2, Feb. 1992—"A Growable Packet (ATM) Switch Architecture: Design Principles and Applications"—Kai Y. Eng., Mark J. Karol, Yu–Shuan Yeh.—pp. 423–430.

Proceedings of the IEEE, vol. 78, n°1, Jan. 1990—"Fast Packet Switch Architectures for Broad–band Integrated Services Digital Networks"—Fouad A. Tobagi—pp. 133–167.

IEEE Journal on Selected Areas in Communications, vol. 7, n°7, Sep. 1989—"A Survey of Modern High–Performance Switching Techniques"—Hamid Ahmadi—pp. 1091–1103.

IEEE Transactions on Computers, Vo.42, n°12, Dec. 1993— "Fast Self–Routing Permutation Switching on an Asymptotically Minimum Cost Network"—Ching Yuh Jan Yavuz Oruç—pp. 1469–1479.

Primary Examiner—Benedict V. Safourek
Attorney, Agent, or Firm—Larson & Taylor

[57] ABSTRACT

An ATM switch includes linewise switching matrices each having m inputs and n outputs (m$\underline{v}$n), and a synchronous interconnection network linking incoming lines of the ATM switch to the inputs of the matrices, the outputs of the matrices being linked to respective outgoing lines of the ATM switch. The synchronous interconnection network includes: k successive stages of groupwise elementary synchronous switches each having at least one and at most p groups of m inputs and at least one and at most p groups of m inputs and at least one and at most p groups of m outputs; groups of m lines each linking a group of m outputs of a groupwise elementary synchronous switch to a group of m inputs of a groupwise elementary synchronous switch of the following stage; and groups of m lines each linking a group of m outputs of a groupwise elementary synchronous switch of the last stage to the m inputs of a linewise switching matrix.

26 Claims, 11 Drawing Sheets

ATM SWITCH USING SYNCHRONOUS SWITCHING BY GROUPS OF LINES

TECHNICAL FIELD

The present invention relates to the field of switching within asynchronous transfer mode (ATM) networks.

BACKGROUND OF THE INVENTION

Although many proposals have been made over the last fifteen years or so regarding the architecture of ATM switches, there are few which meet a genuine industrial objective. To do this it is necessary to take into account the various needs of the network, in particular the dynamic extension of the capacity of the switches, which vary considerably over time and in space.

Among the pioneering work on ATM switches, three noteworthy embodiments may be cited which are based on three totally different basic principles: the Prelude switch (see "Asynchronous Time Division Techniques: An Experimental Packet Network Integrating Video Communication", by A. Thomas et al. Proc. ISS'84, Florence, May 1984, article 32C2); the Starlite switch (see "Starlite: A Wideband Digital Switch", by A. Huang et al., Proc. GLOBECOM '84, Atlanta, December 1984, pages 121–125); and the Knockout switch (see "The Knockout Switch: A Simple, Modular Architecture for High-Performance Packet Switching", by Y. S. Yeh et al., IEEE JSAC, Vol. SAC-5, October 1987, pages 1274–1283). A review of these basic techniques can be read in the article "Fast Packet Switch Architectures for Broadband Integrated Services Digital Networks" by F. A. Tobagi, Proc. IEEE, Vol. 78, No. 1, January 1990, pages 133–167. The Prelude switch is based on time division together with output queues placed in common memory. The Starlite switch uses sorting networks and self-routing networks of Banyan type jointly. The guiding concept of the Knockout switch consists in concentrating the ATM cells from N sources into L outgoing lines synchronously, these L outgoing lines entering a logical queue stationed ahead of the external interface. A loss of cells due to the spatial contention within the concentrator is accepted. Such a case occurs when more than L cells are present simultaneously among N inputs of the concentrator. This loss is acceptable if the mean throughput of the L outputs of the concentrator is small.

When these basic techniques are used, various technological problems prevent the construction of large-sized switches: time sharing very greatly limits the size of the Prelude matrix, and multi-stage structures of the Clos network type must be used. This architecture again encounters problems which are specific to ATM switching, namely that in a variable-throughput switch the blocking rate is difficult to control without a costly overhead. The large-sized Starlite type networks generate a complex set of internal connections. Furthermore, because of the contentions, the order of the cells within a stream may be lost, thereby requiring reordering at the switch output. The Knockout switch has the drawback of squared growth in the number of filtering and interconnection elements.

Many proposals have been made for solving the problem of the architecture of large-sized ATM switches. In the article "KSMINs: Knockout Switch Based Multistage Interconnection Networks for High-Speed Packet Switching" (Proc. GLOBECOM '90, San Diego, December 1990, Vol. 1, pages 218–223), Y. M. Kim et al. propose to interconnect Knockout switches according to a Banyan type multi-stage network, so as to achieve N.logN complexity. However, this solution has the drawback of requiring several queueing stages and, furthermore, blockages may occur within the internal links of the multi-stage network.

The Knockout (K.O.) architecture has been generalized by its creators and described in the article entitled "A Growable Packet (ATM) Switch Architecture: Design Principles and Applications" (K. Y. Eng et al., IEEE Trans. on Communications, Vol. 40, No. 2, February 1992, pages 423–430). This generalized architecture is referred to as "K.O.-bis" below. The K.O.-bis architecture exhibits the following distinctive features:

2A—like the K.O., the K.O.-bis is synchronous up to the single queue at the output, and naturally it complies with the sequencing of the ATM cells;

2B—the basic terminal module is (for example) a 42×16 matrix which may be embodied in various ways (time sharing with or without memory sharing, or pure Knockout etc.);

2C—these terminal matrices are connected to a synchronous interconnection network which thus exhibits a certain expansion ratio;

2D—the principle of the statistical elimination of cells is generalized for the fixed groups of lines leaving the synchronous interconnection network, for example a group of 42 lines carrying the traffic of 16 external interfaces;

2E—the interconnection network is made of two stages, interconnected together and with the final stage of matrices in a conventional manner in order to form a Clos network which is non-blocking, as long as there are not more than (for example) 42 cells simultaneously destined for the same output matrix;

2F—a global algorithm on input to the network eliminates the excess cells in order to achieve condition 2E above;

2G—this algorithm is followed by another global algorithm for allocating paths, through the interconnection network, for all cells at a given instant. The authors have demonstrated that the algorithm introduces a fairly small additional loss of cells.

This architecture necessitates a very fast technology in order to execute these two algorithms which have to examine, for each cell time, all the cells entering the switch. The size of the switch is thus limited by the technology required. The interconnection network of this architecture represents a single range of switches with a fixed maximum size. Changing range would require a total change in the interconnection network. Finally, because of the complete interconnection fabric between the network and the last stage, the outlay is large since the terminal matrices alone may be rigged up along the way, and not the network.

An object of the present invention is to propose a novel architecture for an ATM switch which is better adapted than those known previously to the technological constraints imposed by the high-throughput asynchronous transfer mode.

SUMMARY OF THE INVENTION

According to the invention, an ATM switch comprises linewise switching matrices each having m inputs and n outputs, m and n being two integers such that m≦n, and a synchronous interconnection network linking incoming lines of the ATM switch to the inputs of the linewise switching matrices, the outputs of the linewise switching matrices being linked to respective outgoing lines of the ATM switch. The synchronous interconnection network comprises k successive stages of groupwise elementary synchronous switches each having at least one and at most p groups of m inputs and at least one and at most p groups of m outputs, k and p being integers with $p \geq 2$, groups of m lines each linking a group of m outputs of a groupwise elementary synchronous switch to a group of m inputs of a groupwise elementary synchronous switch of the following stage, and groups of m lines each linking a group of m outputs of a groupwise elementary synchronous switch of the last stage to the m inputs of a linewise switching matrix.

The linewise switching matrices route the cells on the basis of the identity of an output line, whereas the groupwise elementary synchronous switches route the cells on the basis of the identity of a group of destination lines.

Preferably, each groupwise elementary synchronous switch (GESS) comprises at least one and at most p elementary concentrators with pm inputs and m outputs, the m outputs of each elementary concentrator constituting a group of m outputs of said GESS, and each input of said GESS being linked to a respective input of each of the elementary concentrators of said GESS by way of a filter for eliminating ATM cells not destined for an output of said elementary concentrator. The interconnection network is then based on elementary switches with broadcasting, filtering and concentration, so that it generalizes the Knockout principle.

Typically, the synchronous interconnection network of an ATM switch with N'c'm incoming lines and N'c'm outgoing lines comprises c' groupwise synchronous switching cores, c' being an integer at most equal to c=m/n. Each groupwise synchronous switching core has at least N'm input lines synchronously receiving the ATM cells arriving on the N'c'n incoming lines of the ATM switch.

According to a second aspect of the invention, a groupwise synchronous switching core (GSSC) comprises N' groups of m output lines, at least N'm input lines, and k stages of groupwise elementary synchronous switches, N', m and k being integers with $N' \geq 2$ and $m \geq 2$. Each GESS includes at least one and at most p elementary concentrators with pm inputs and m outputs, p being an integer at least equal to 2 such that $N' \leq p^k$, the m outputs of each elementary concentrator constituting a group of m outputs of the GESS, and each input of the GESS being linked to a respective input of each of its elementary concentrators by way of a filter for eliminating ATM cells not destined for an output of said concentrator. The GESSs of the successive stages are interconnected by groups of m lines each linking a group of m outputs of a GESS to m inputs of a GESS of the following stage, the input lines of the GSSC being linked to inputs of the GESSs of the first stage, and the groups of m outputs of the GESSs of the last stage being respectively linked to the N' groups of m output lines of the GSSC.

In the remainder of the exposition, the abbreviation GSSC will be used to denote a groupwise synchronous switching core, and the abbreviation GESS to denote a groupwise elementary synchronous switch. A GSSC is characterized by the following properties 3A to 3E:

3A—the ATM cells are aligned on input to the GSSC, that is to say they enter the GSSC at the same time;

3B—the time of transit through the GSSC for all the cells is the same (synchronism), this implying in particular the absence of intermediate queues;

3C—each cell itself carries sufficient information (if need be with a prefix attached to the standard ATM cell) to designate the group (or possibly the groups, in the case of a broadcast) of output lines to which it has to be routed;

3D—such a cell can be injected into any input line of any group. Stated otherwise, at each instant the cells in a group are switched individually to a priori different output groups;

3E—each cell is routed to an undetermined line belonging to the designated output group. Stated otherwise, for the GSSC only the group identity is of importance, the identity of a line within a group being irrelevant.

The ATM switch according to the invention complies with principles 2A, 2B, 2C, 2D mentioned above. On the other hand, it differs from the K.O.-bis as regards items 2E, 2F and 2G. Indeed, it is proposed to omit both the previous global K.O. control algorithm and the path allocation algorithm. All the cells are sent to the interconnection network made up of the GSSCs after random distribution, and the excess cells are eliminated along the way within the interconnection network. Moreover, said network does not follow a 3-stage Clos topology; it is typically a Banyan network of any type and any dimension, whose internal links are the groups of lines which are sufficient in number for the K.O. principle of statistical multiplexing with small loss to apply to each stage. The present invention makes recursive use of the K.O. principle within a Banyan or Delta architecture of groups of lines and GESSs. By virtue of the prior random distribution this is possible with a very small cell loss rate. It will be shown below that this architecture intrinsically allows any broadcasts; that it allows a limitless maximum size since the latter is independent of the technology; that the ranges of switches follow an optimum growth factor; that furthermore the outlay for a given maximum size is relatively small.

DETAILED DESCRIPTION OF PREFERRED EMBODIMENTS

An ATM switch according to the invention and used to its full capacity will firstly be described, and later on the manner in which the capacity of such a switch can be made to grow without disturbing the traffic will be examined.

Figure 1:
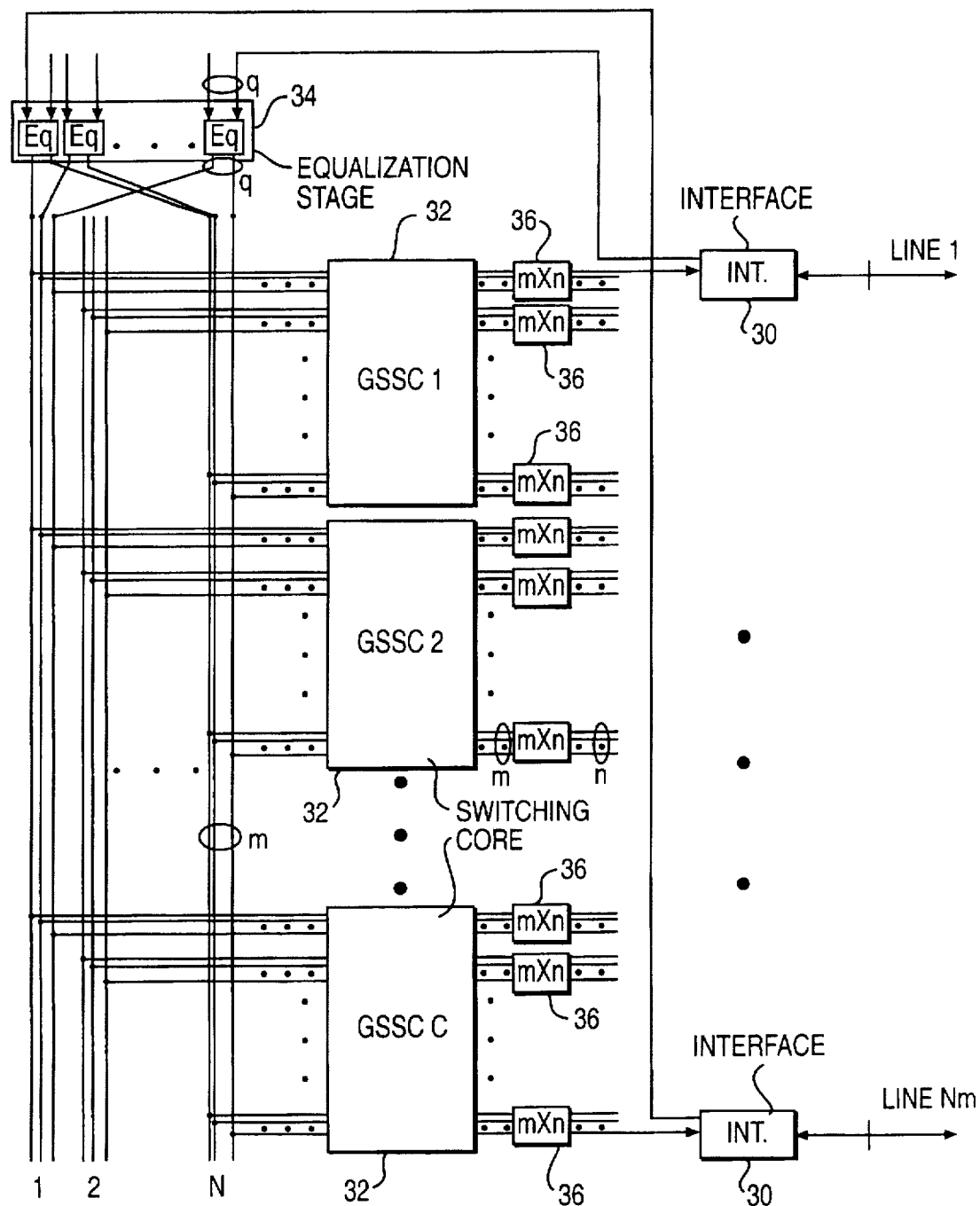
FIG. 1 is an overall diagram of an ATM switch according to the invention.

The switch represented in FIG. 1 manages Nm two-way lines, that is to say Nm incoming lines and Nm outgoing lines. An interface 30 is provided for each two-way line, so as to separate the incoming and outgoing lines and to perform certain processing operations on the ATM cells to be switched.

The switch comprises a synchronous interconnection network consisting of c GSSCs 32 each having N groups of m input lines and N groups of m output lines. Each input line of each GSSC is linked to a line interface 30 through a traffic equalization stage 34. At each cell arrival time, the Nm input lines of each GSSC receive, synchronously, the ATM cells arriving on the Nm incoming lines of the switch. Each group of m output lines of each GSSC is associated with a respective linewise switching matrix 36 switching m inputs to n outputs. Each matrix 36 has its m inputs respectively linked to the m lines of the associated group. Each of its n outputs is linked to a respective line interface 30 in order to route the received cells to the destination outgoing line.

Each GSSC 32 performs a switch on the sole basis of the identity of the group of output lines. Differentiation between the various lines of one and the same group is carried out by the matrices 36. In the example of FIG. 1, we have m=c.n. The matrices 36 therefore achieve an integer concentration factor c, and each group of m output lines of a GSSC carries only maximum traffic corresponding to m/c Erlangs. This reduction in traffic, corresponding to an expansion of the network, depends on the value of m.

Depending on the concentration/expansion factor desired and/or permitted by the overall design of the switch, it may be elected to produce terminal matrices 36 of size 64×32, 48×16 or 32×8 for example. The various known methods of designing an ATM matrix (memory sharing and/or time sharing, interconnection network, Knockout etc.) can be adapted to produce the matrices 36 in the present architecture. Adaptation consists in complying with the following specifications:

the input lines are synchronized with the starts of the cells;

a cell belonging to any ATM connection of any output line may be located on any one of the input lines;

the operation of the matrix must be synchronous up to writing into the queue or queues preceding the interface 30, so as to comply with the sequences of cells within the ATM connections; and each cell must carry within it the information required for its ultimate shaping in accordance with the standards defined for the external interfaces, in particular as regards the VPI/VCI fields of the ATM header ("Virtual Path Identifier/Virtual Channel Identifier").

Figure 2:
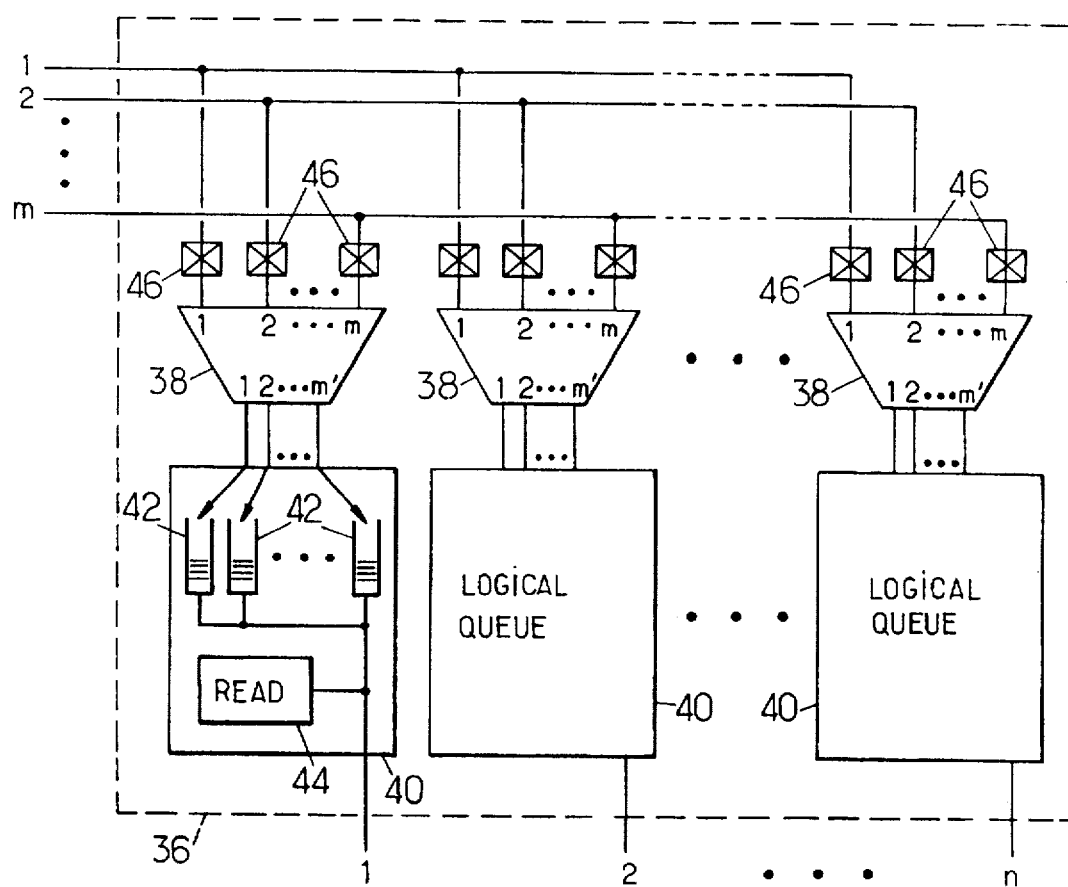
FIG. 2 is a diagram of an embodiment of an m×n linewise switching matrix.

By way of example, FIG. 2 shows an embodiment of a terminal matrix 36 of Knockout type. In this embodiment, the matrix is a set of n multiplexers respectively associated with the n outputs. Each multiplexer comprises a concentrator 38 with m inputs and m' outputs, and a logical queue 40. Each logical queue 40 comprises m' physical queues 42 each linked to one of the m' outputs of the associated concentrator 38, and read logic 44 which reads in turn from the physical queues 42 so as to comply with a first-in first-out (FIFO) protocol at output. Each input of the terminal matrix 36 is linked to a respective input of each of the n concentrators 38 by way of respective filters 46 which eliminate, on input to each concentrator 38, the ATM cells which are not destined for the corresponding output of matrix 36.

The size of the concentrators 38 is for example m=32, m'=16. In accordance with the Knockout principle, the loss due to contention within the concentrators 38 is then negligible.

The GSSCs are embodied on the basis of elementary concentrators each having pm inputs and m outputs. The number N of groups of lines switched by each GSSC is of the form $p^k$. The GSSC breaks down into k stages each including $p^{k-1}$ GESSs each having p groups of m inputs and p groups of m outputs.

Figures 3, 4:
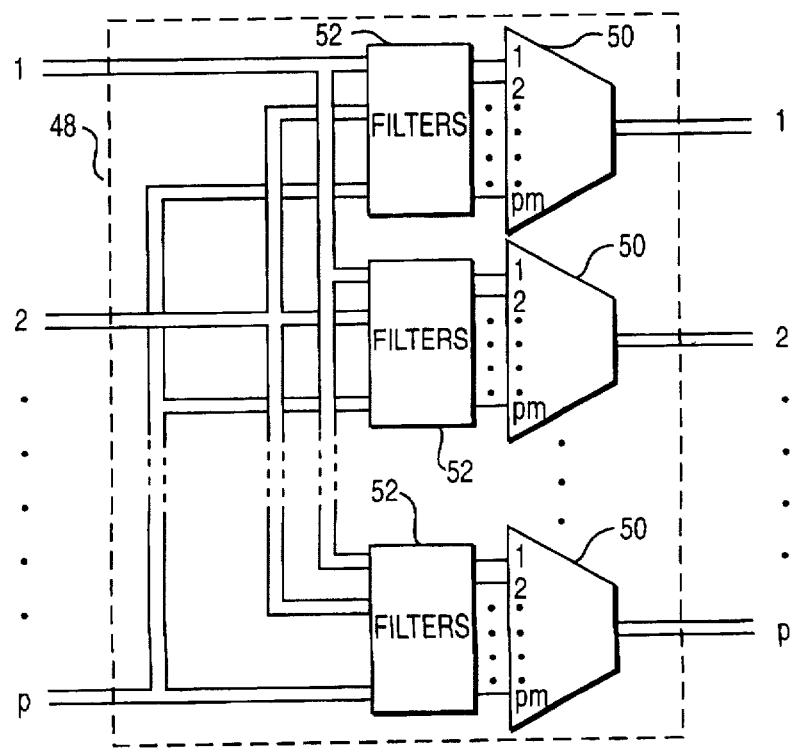
FIG. 3 is a diagram of a GESS with p groups of m input lines and p groups of m output lines.
FIG. 4 is a diagram illustrating the recursive construction of an ATM switch according to the invention.

The structure of a GESS 48 is represented in FIG. 3. The GESS 48 comprises p elementary concentrators 50 each having its m outputs constituting a group of m outputs of the GESS. Each input of the GESS is linked to an input of each elementary concentrator 50 by way of a respective filter 52. To simplify FIG. 3, a bank of pm filters 52 upstream of each concentrator 50 has been represented. Each filter of such a bank handles an input line of the concentrator in order to eliminate the ATM cells which are not destined for its group of m outputs.

FIG. 4 illustrates the manner in which the architecture of an ATM switch according to the invention may be constructed recursively. A module $M_0$ is firstly defined, corresponding to a terminal switching matrix such as that represented in FIG. 2. The module $M_0$ therefore has $p^0=1$ group of m inputs and $p^0.n=n$ outputs. For i>0, a module $M_i$ is constructed from $p^{i-1}$ GESSs 48 and from p modules $M_{i-1}$. The various groups of m inputs of each module $M_{i-1}$ are each linked to a group of m outputs of a respective GESS. It may be verified that the module $M^i$ includes $p^i$ groups of m inputs and $p^i.n$ outputs, an ATM cell arriving on any one of the $p^i.m$ inputs being routable to any one of the $p^i.n$ outputs. The GESSs of a module $M_i$ are interconnected together according to a self-routing Banyan network (i.e. a Delta network of order p) with i stages, the internal links of which consist of groups of m lines, each stage including $p^{i-1}$ GESSs. For i=k, this network of GESSs constitutes a GSSC with N groups of input lines and N groups of output lines.

Figure 5:
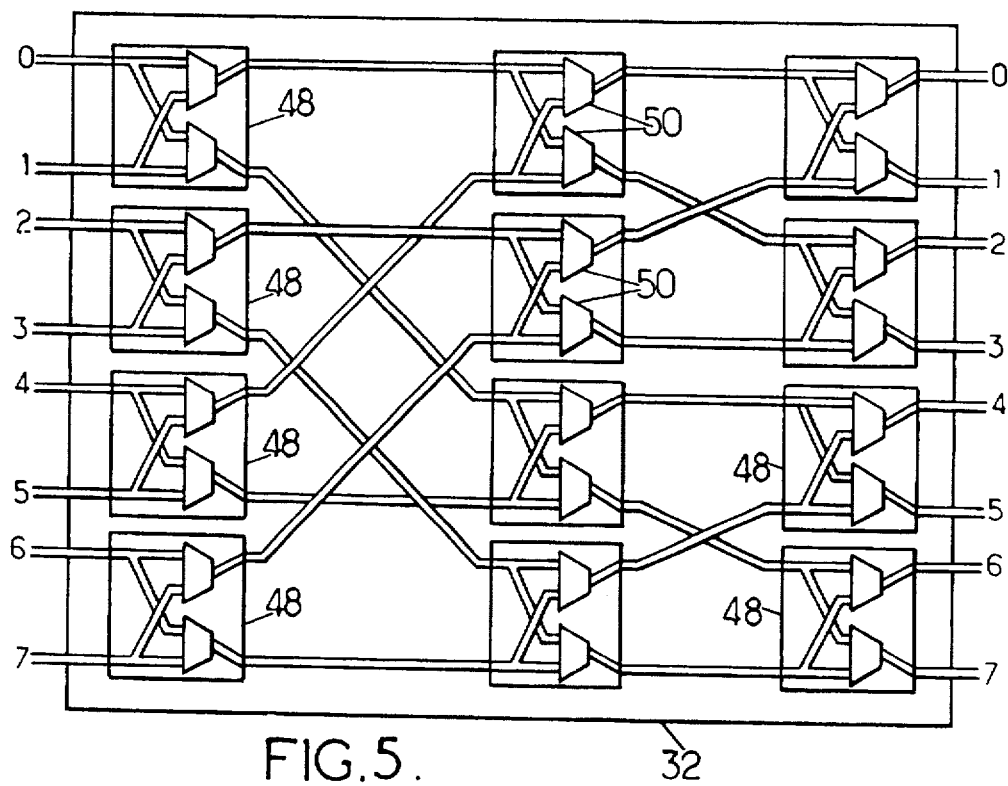
FIG. 5 is a diagram of a GSSC with eight groups of input lines and eight groups of output lines.

FIG. 5 shows such a GSSC 32 in the particular case p=2, k=3 (N=8). The banks of filters 52 associated with the concentrators 50 are not represented in order to simplify the figure. It may be verified that, irrespective of the input line on which an ATM cell arrives, there is a path enabling this cell to be routed to any group of output lines, and that this path is unique if it is regarded as a succession of groups, the groups of lines constituting the internal links of the Delta network.

The internal connections between GESS stages all have the same characteristics, i.e. each link transports a fixed number m of individual streams with the same throughput. These streams may be placed in parallel or fully or partially multiplexed depending on the technological possibilities.

The loss calculations carried out in the aforesaid article by Y. S. YEH et al., are recalled here, in a slightly different form, in order to analyse the performance of the GSSC in terms of loss of cells. Only point-to-point connections are considered in these calculations for simplicity. However, the cell loss rates obtained are valid irrespective of the number of broadcast trees. To be convinced of this it suffices to observe, looking at the example of FIG. 5, that:

the cells entering each concentrator at each instant are all different: there is no spatial autocorrelation. The temporal autocorrelation is also eliminated since there is no broadcasting inside one and the same physical interface;

the traffic leaving the switch being independent of the nature of the connections, the greater the broadcast traffic, the less incoming traffic there is and the smaller are the loss rates.

Consider a concentrator of M independent sources having m outputs. The relevant cells are those destined for one of the m outputs, since the others are eliminated by the filter bank upstream of the concentrator and do not come into the loss calculation. Under these assumptions, if the individual quantities of traffic from the sources are equal (this being known to be the worst case from the viewpoint of the loss of cells), the probability P(i) of the simultaneous presence of i cells is given by the binomial formula (where C(N,i) denotes the binomial coefficient M!/[i!(M−i)!]):

$$P(i)=C(M,i)\cdot \alpha^i \cdot (1-\alpha)^{M-i}$$

where $\alpha$ represents the individual traffic of each incoming line, i.e. the probability of a cell appearing on an individual line. Considering a fixed value of $M\alpha=\rho$, irrespective of M ($\rho$ is the mean throughput of a group of m outgoing lines), this formula makes it possible to write:

$$P(i)=C(M,i)\cdot (\rho/M)^i \cdot (1-(\rho/M))^{M-i}$$

On observing that there is a loss of (i−m) cells from the concentrator for every i>m, the mean loss of cells can be written:

$$LOSS = \sum_{i=m+1}^{M} ((i-m)\cdot P(i)) = \rho - \sum_{i=0}^{m}(i\cdot P(i)) - m\cdot \left(1 - \sum_{i=0}^{m} P(i)\right)$$

The loss rate is therefore given by:

$$LR(M,m) = LOSS/\rho = \left[\rho - m + \sum_{i=0}^{m}((m-i)\cdot P(i))\right]/\rho$$

We note that when $\rho$ is fixed, and for M large enough, the binomial law converges to Poisson's law, and the sequence of probabilities P(i) can then be replaced by:

$$P(i)=e^{-\rho}\cdot (\rho^i/i!)$$

This gives an asymptotic upper bound value for the cell loss, independent of M.

Tables I to III give the loss rates from concentrators of various sizes, under the assumption of the independence of the sources, and p=2. They are respectively: 128 to 64 concentrator (with individual traffic for the outgoing lines of around 0.5 Erlangs), 96 to 48 concentrator (individual outgoing traffic of around 0.33) and 64 to 32 concentrator (individual outgoing traffic of around 0.25). The values are regarded as negligible when they are below $10^{-16}$.

Table I shows that the embodiment of a 128 to 64 concentrator makes it possible to devise a family of switches based on the values p=2, c=2, m=64, n=32, with an then has an expansion ratio equal to 2.

Table II corresponds to an expansion ratio of 3, using terminal matrices of 48×16.

Table III corresponds to the 64×32 concentrators and 32×8 matrices, the simplest to construct, at the cost of an expansion ratio of 4. In the three tables, the cell losses correspond to the mean traffic of the external interface of 0.7, 0.8, 0.9 and 1 Erlang.

However, the above calculations are only valid for the loss rate in the first stage of a GSSC, where the assumption of independence of the sources is always justified. It remains to show that the total loss rate within the GSSC (LR(total)) is also acceptable. Now, the GSSC generally includes several stages, and for the subsequent stages the sources are no longer independent. The first stage for broadcasting, filtering and concentrating cells introduces a certain correlation between them, and the loss rates in the subsequent stages should be expected to be higher.

The exact calculation bringing in said correlation is complex, but, by assuming that the traffic is split up homogeneously over all the concentrators (this is carried out by the traffic equalizers), it is possible to evaluate an upper bound value for the total loss rate:

$$LR(total) < \sum_{i=1}^{k} (LR(\rho^i \cdot m, m))$$

Tables IV to VI give the upper bound values for the loss rates in three GSSCs each of k=4 stages with p=2. Table IV corresponds to an expansion 2 and to 1024 external interfaces. Table V corresponds to an expansion of 3 and to 768 external interfaces. Table VI corresponds to an expansion 4 and to 512 external interfaces. The traffic values used are the same as those used in Tables I to III, namely corresponding to 0.7, 0.8, 0.9 and 1 Erlang on an external interface.

TABLE I

| outgoing line traffic ρ/m | 0.35 E | 0.4 E | 0.45 E | 0.5 E |
|---|---|---|---|---|
| group 64 outgoing traffic ρ | 22.4 E | 25.6 E | 28.8 E | 32 E |
| loss rate (128, 64) | negligible | $4.6 \cdot 10^{-16}$ | $1.3 \cdot 10^{-12}$ | $1.5 \cdot 10^{-11}$ |

TABLE II

| outgoing line traffic ρ/m | 0.23 E | 0.26 E | 0.3 E | 0.33 E |
|---|---|---|---|---|
| group 48 outgoing traffic ρ | 11.2 E | 12.8 E | 14.4 E | 16 E |
| loss rate (96, 48) | negligible | negligible | negligible | $8.4 \cdot 10^{-16}$ |

TABLE III

| outgoing line traffic ρ/m | 0.175 E | 0.2 E | 0.225 E | 0.25 E |
|---|---|---|---|---|
| group 32 outgoing traffic ρ | 5.6 E | 6.4 E | 7.2 E | 8 E |
| loss rate (64, 32) | negligible | negligible | $3.8 \cdot 10^{-16}$ | $7.4 \cdot 10^{-15}$ |

TABLE IV

| Load for a group of 64 | 22.4 E | 25.6 E | 28.8 E | 32 E |
|---|---|---|---|---|
| Total loss rate < | $7.2 \cdot 10^{-15}$ | $2.2 \cdot 10^{-12}$ | $2.3 \cdot 10^{-10}$ | $1.1 \cdot 10^{-8}$ |
| Asymptotic rate | $1.6 \cdot 10^{-14}$ | $3.2 \cdot 10^{-12}$ | $2.9 \cdot 10^{-10}$ | $1.2 \cdot 10^{-8}$ |

TABLE V

| Load for a group of 48 | 11.2 E | 12.8 E | 14.4 E | 16 E |
|---|---|---|---|---|
| Total loss rate < | negligible | $4.5 \cdot 10^{-16}$ | $4.7 \cdot 10^{-14}$ | $1.8 \cdot 10^{-12}$ |
| Asymptotic rate | negligible | $1.7 \cdot 10^{-15}$ | $7.0 \cdot 10^{-14}$ | $2.5 \cdot 10^{-12}$ |

TABLE VI

| Load for a group of 32 | 5.6 | 6.4 E | 7.2 E | 8 E |
|---|---|---|---|---|
| Total loss rate < | negligible | $1.4 \cdot 10^{-14}$ | $3.1 \cdot 10^{-13}$ | $4.5 \cdot 10^{-12}$ |
| Asymptotic rate | $2.2 \cdot 10^{-15}$ | $1.7 \cdot 10^{-14}$ | $3.7 - 10^{-13}$ | $5.2 \cdot 10^{-12}$ |

The last row of each table provides the asymptotic value of the higher terms, and this allows rapid estimation of upper bound values for the loss rates in the largest sized GSSCs: for each additional stage it suffices to add the indicated value of the asymptotic rate once.

If the ATM switch does not include a traffic equalization stage upstream of the GSSCs 32, the above calculations are not valid since the assumption of one and the same mean traffic load for all the concentrators no longer holds. In certain cases, the "natural" imbalance in the quantities of traffic on the groups of internal links of the GSSC may render the blocking rate of the switch unacceptable. Nevertheless, for concentrators of relatively large size and/or under assumptions of smaller mean individual throughput, this blocking rate may drop to a very low level, by virtue of the law of large numbers.

The traffic equalization stage 34 such as illustrated in FIG. 1 aims to eliminate or at least greatly reduce this blocking factor. In a GSSC with N groups of m lines using pm-to-m concentrators, so that the traffic is homogeneous within the internal links of the GSSC, it is necessary and sufficient for each GESS or concentrator of the first stage to receive a statistically equal share of the total traffic destined for each output group of the GSSC.

Figure 6:
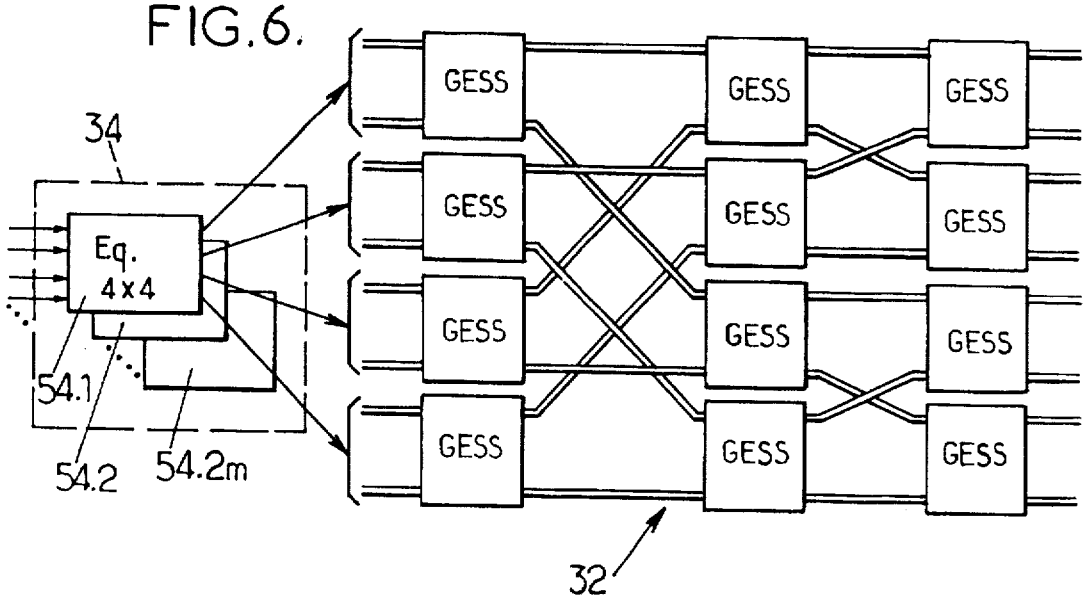
FIGS. 6 to 8 are diagrams illustrating possible configurations of a traffic equalization stage within an ATM switch according to the invention.

Each traffic equalizer should therefore be connected to each concentrator of the first stage of a GSSC. In other words, each equalizer should equalize the traffic of $N/p=p^{k-1}$ lines each linked to different GESSs of the first stage. To do this it suffices to use pm equalizers each equalizing the individual traffic of $q=N/p=p^{k-1}$ lines. FIG. 6 shows such a configuration of the equalization stage 34 upstream of a GSSC 32 in accordance with that of FIG. 5 (p=2, k=3, N=8). The stage 34 includes 2m equalizers 54.1 . . . . 54.2m each having q=4 inputs and q=4 outputs each linked to an input of a respective GESS of the first stage. The equalization of traffic on the GESSs of the first stage ensures the equalization of the traffic on the GESSs of the subsequent stages. Each output of an equalizer is broadcast to corresponding input lines of the various GSSCs of the ATM switch, as illustrated in FIG. 1.

Figure 7:
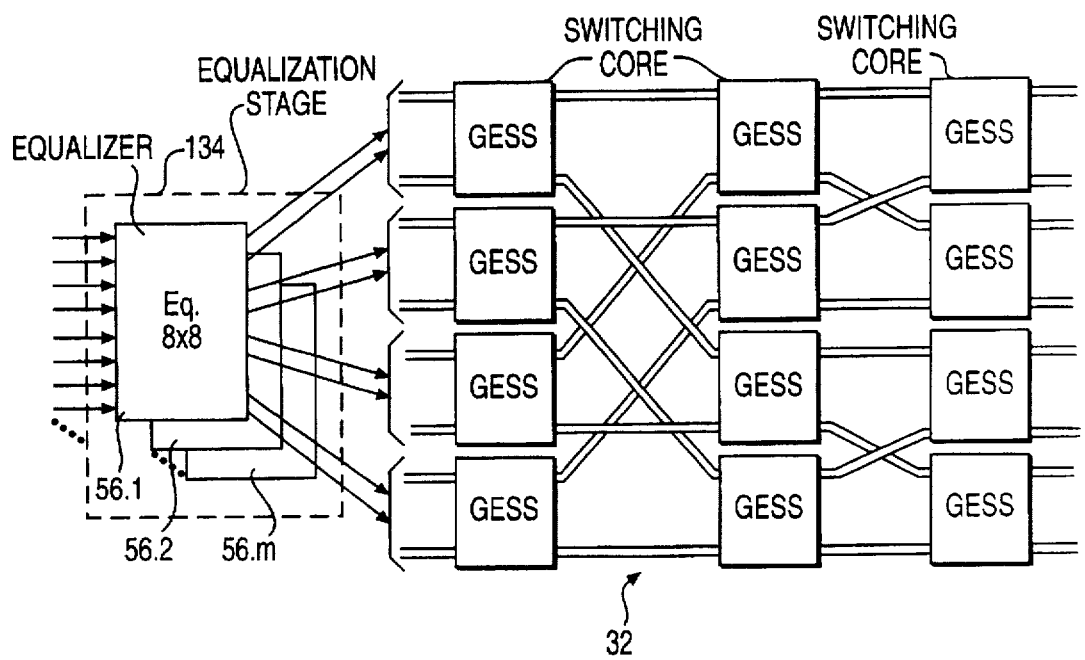

Optimal traffic equalization can also be achieved by using pm/y equalizers of $q=p^{k-1}.y$ lines each, and by connecting y lines between each equalizer and each GESS of the first stage of a GSSC, for any integer y dividing pm. FIG. 7 shows such a configuration of the traffic equalization stage 134, with the same GSSC as in FIGS. 5 and 6 (p=2, k=3, N=8), and with y=2. The stage 134 includes m equalizers 56.1, . . . 56.m each having q=8 inputs and q=8 outputs linked in pairs to inputs of a respective GESS of the first stage.

Figure 8:
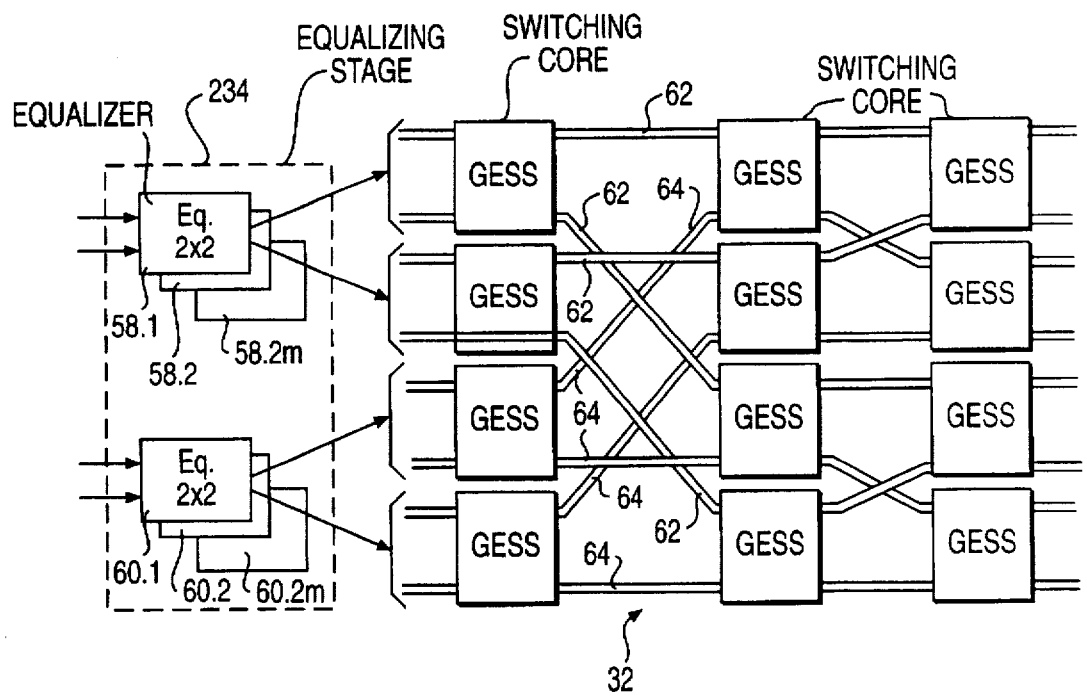

Another possibility is to provide partial traffic equalization. In this case, the GESSs of the first stage of a GSSC are split up into Z sets, and the equalization stage is laid out so as to equalize the traffic received by the various GESSs of each set. FIG. 8 shows such a configuration of the traffic equalization stage 234, with the same GSSC as in FIGS. 5 to 7 (p=2, k=3, N=8), the GESSs of the first stage of which are split up into Z=2 sets. Stage 234 includes 4m equalizers 58.1, . . . , 58.2m and 60.1, . . . , 60.2m each having 2 inputs and 2 outputs. The equalizers 58.1, . . . . 58.2m are associated with the first set of GESSs: the 2 outputs of each of them are linked respectively to inputs of the 2 GESSs of the first set. Similarly, the equalizers 60.1 . . . . 60.2m are associated with the second set of GESSs. The GESSs of the second stage each receive a group of m lines 62 coming from a GSSC of the first set of the first stage and a group of m lines 64 coming from the second set of the first stage. The equalization of the traffic is therefore complete from the second stage onwards, and within each set of GESSs of the first stage. Only among the traffic passing through the two sets of GESSs of the first stage may a heterogeneity remain. The cell losses which may result from this are however very few in number.

Figure 9:
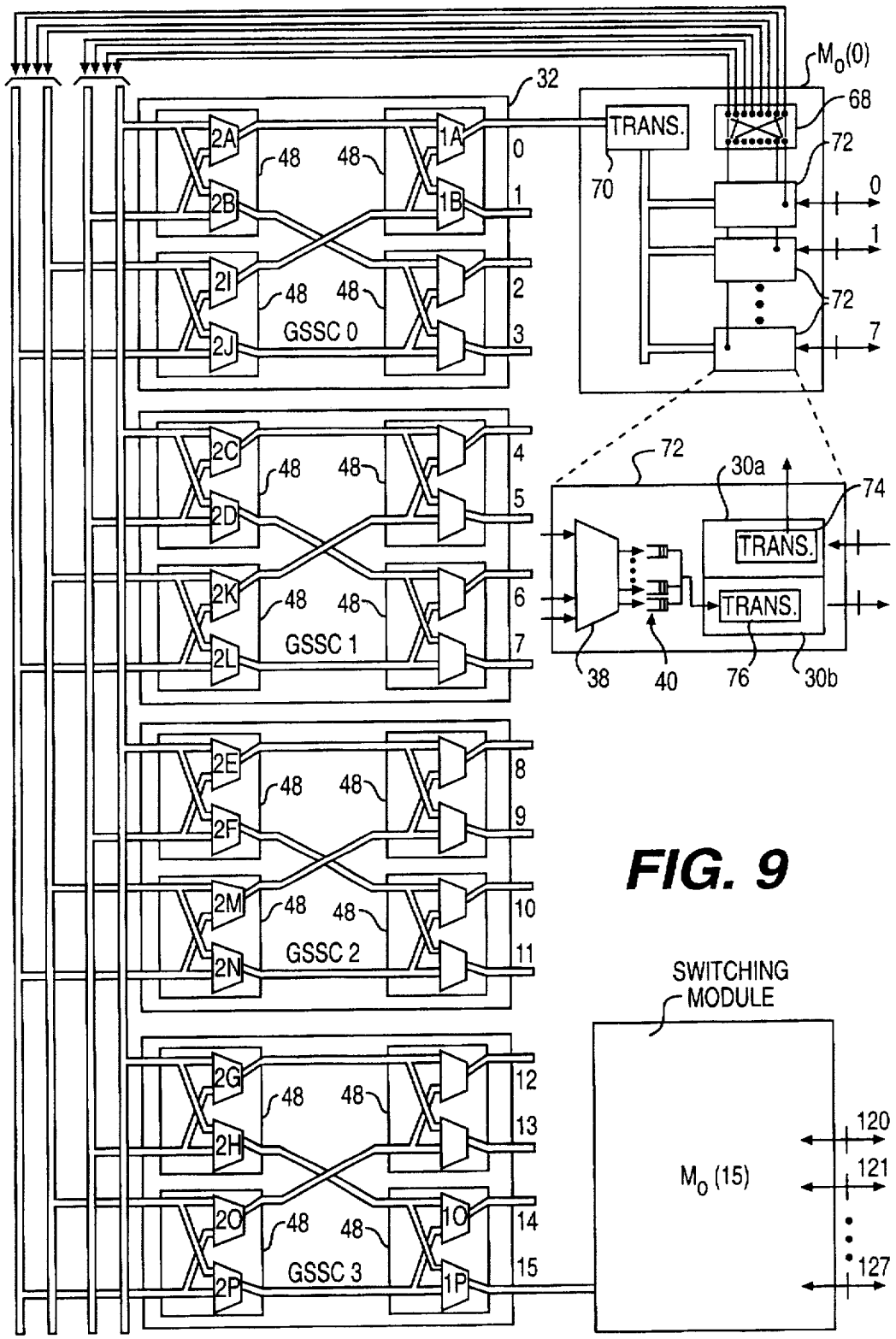
FIG. 9 is a diagram of an ATM switch according to the invention with 128 incoming lines and 128 outgoing lines.

FIG. 9 shows a possible layout of a 128×128 switch according to the invention, in the case p=2, k=2, N=4, m=32, n=8, c=4, q=8. The cell filters 46 and 52 are not represented so as to simplify the figure. The c=4 GSSCs have a total of cN=16 groups of output lines numbered from 0 to 15 and each linked to a module $M_0$. Apart from a linewise terminal switching matrix, each module $M_0$ comprises n=8 line interfaces, an equalizer 68 of q=8 lines and an intermediate translation element 70. For each external two-way line, the module $M_0$ comprises a line front end 72 which includes the corresponding multiplexer of the terminal matrix (filters 46 not represented, concentrator 38 and logical queue 40) and the line interface including an incoming interface 30a and an outgoing interface 30b. The incoming interface 30a carries out shaping operations required for ATM transmission. It comprises in particular an initial translation element 74 to provide for the routing of the cells through the switch.

Similarly, the outgoing interface 30b includes a final translation element 76 for writing the new VPI/VCI fields into the outgoing cells. The equalizer 68 of a module $M_0$ has its inputs linked to the 8 incoming lines of this module; 4 of its outputs are linked to 4 inputs of one and the same GESS 48 of the first stage of each GSSC 32; and its other 4 outputs are linked to 4 inputs of the other GESS of the first stage of each GSSC (referring to the explanations given in connection with FIG. 7, we have here the case y=4: there are pm/y=16 equalizers 68 of $q=p^k.y=8$ lines, namely one per module $M_0$).

Figure 10:
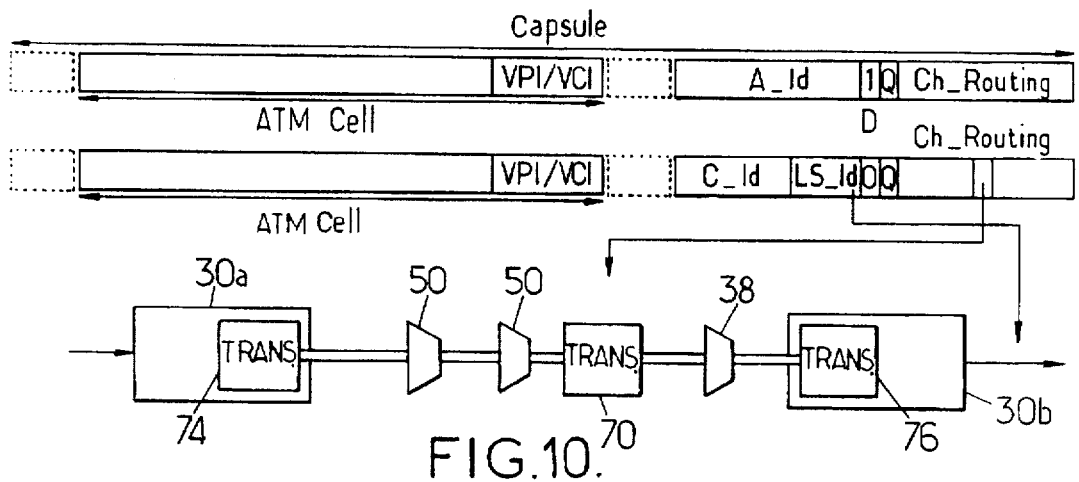
FIG. 10 shows the structure of a data capsule travelling through an ATM switch according to the invention.

For the transfer of each ATM cell within the switch, a packet format is defined which encapsulates the standard ATM cell. Such a packet is called a "capsule" hereinbelow. The information added to the cells in the capsules leads to an increase in either the throughput or the load of the internal links. The capsule contains information in a form appropriate for simplifying the setup of the filters 46, 52 of which there are a relatively large number in the switch. This information is written by the elements 74, 70 for initial and/or intermediate translation. An exemplary capsule format is illustrated in FIG. 10 where only the fields useful for routing are indicated. Additional fields could be included (for example within the dotted areas) in order to aid with the accomplishing of other functions. These additional fields could contain test or control data, or cyclic redundancy checksums (CRC) for the detection and/or correction of errors.

FIG. 10 illustrates the structure of a capsule in the case of a cell to be broadcast to several outgoing lines (upper diagram) and in the case of a point-to-point connection (second diagram). The presence of a 1 or a 0 in a one-bit field D makes it possible to distinguish between the two cases. The lower diagram illustrates the path taken by a cell from the input to the output of the switch.

A module $M_i$ in the sense of FIG. 4, which includes intermediate translation elements 70 immediately upstream, is referred to as an intermediate module. The presence of this translation arises from a twofold need: in the first place, the field of the routing bits in the capsules must be fairly short and of fixed length: in the second place, to allow arbitrary broadcasting, one bit per possible destination must be reserved in the routing field. Starting from a given input, there is only one path to a given submodule. Consequently, each routing bit in general indicates an intermediate module (as shown in FIG. 10), and not a specific group of lines of this module. The two cases merge only when the module $M_O$ is defined as an intermediate module, this being the case in the example of FIG. 9.

Initial translation is carried out by the elements 74 by means of translation tables stored in memory in the line front ends, on the incoming side. Starting from the implicit identity of the line and the VPI/VCI field, the translator 74 writes both the identity of the connection and the routing field (Ch_Routing) into the capsule, thereby enabling the capsule to be routed up to the next translation (or translations in the case of broadcasting). To ensure unrestricted broadcasting, each bit of Ch_Routing represents an intermediate module: this bit is at 1 if the intermediate module is to receive the capsule in question, and at 0 otherwise.

To optimize the memory, each connection is associated with an internal identifier. This identifier (A_Id) is global in respect of the switch in the case of a broadcast tree. A large number of point-to-multipoint connections (broadcast trees) can therefore be freely defined, within the limits imposed by the length adopted for the field A_Id. In the event of a point-to-point connection, the internal identifier (C_Id) is local to the outgoing line, the identity of the outgoing line (LS_Id) is defined inside the intermediate module. In FIG. 10, the VPI/VCI field is separated from the other fields for the sake of clarity. However, there is clearly some redundancy which would allow possible optimization by reusing the same space for various fields, something which would slightly affect the format of the capsule. Each intermediate translator 70 tests either the bit Q (which indicates the qualification of a cell), or the same bit (in Ch_Routing) already tested by the filter of the concentrator immediately upstream, so as to be able to disqualify the cells which are not destined for the intermediate module which it is controlling. This can be done by setting to zero the routing field. Next, knowing the unambiguous identity of the connection within the intermediate module (either by A_Id or by LS_Id and C_Id), the translator can recreate the routing bits field up to the following intermediate or final translation. In the routing field created by the latest intermediate translation (the latter may be the only one, as the example of FIG. 9 shows), each bit corresponds to an outgoing line. The functions of intermediate translation are executed synchronously.

The final translation is done by the elements 76 in the line front ends on the outgoing side. After having qualified the cell as indicated previously, the translator 76 writes the outgoing VPI/VCI field which it calculates as a function of the contents of the field C_Id or A_Id.

Figure 11:
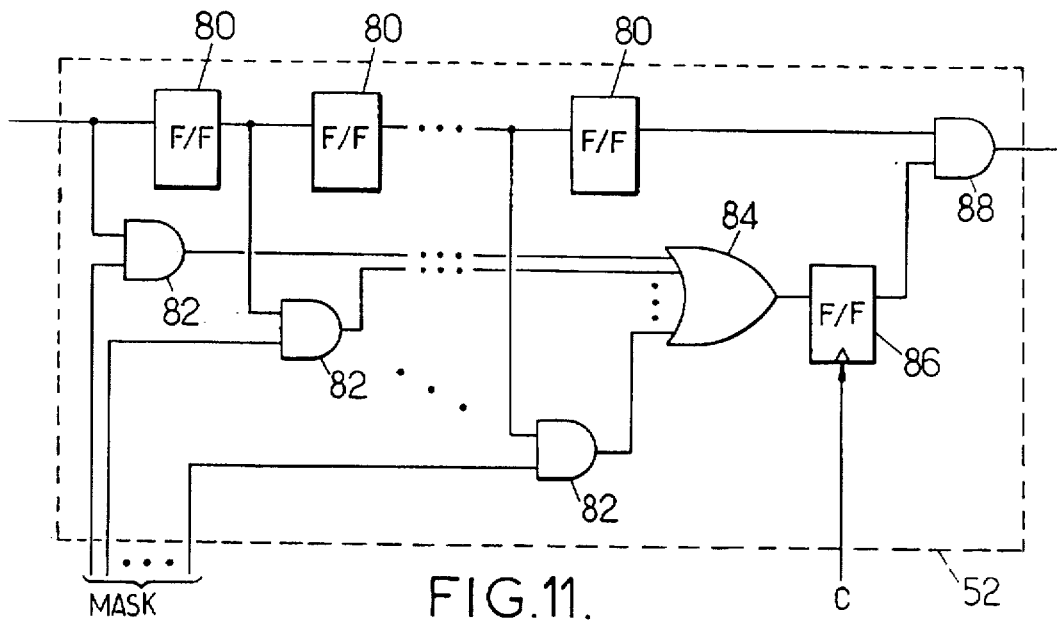
FIG. 11 is a diagram of a broadcasting and filtering element usable within the GESSs.
Figure 12:
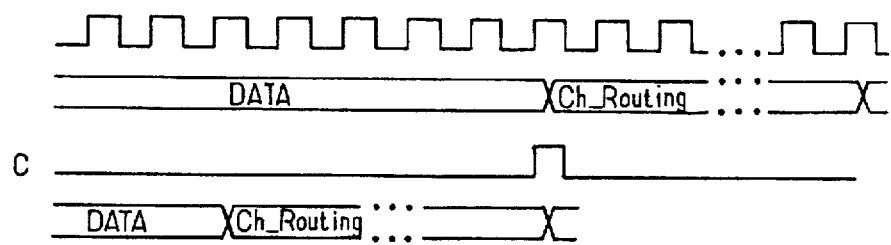
FIG. 12 shows timing diagrams illustrating the operation of the broadcasting and filtering element of FIG. 11.

FIG. 11 shows a filter 52 usable on an input line of an elementary concentrator of a GSSC. If r denotes the number of bits of the routing field Ch_Routing, the filter 52 includes a shift register with r flip-flops D 80 gated by the bit clock (upper line of FIG. 12). The input of the filter, which is the input of the shift register, serially receives a capsule comprising the routing field and then the remainder of the data of the capsule (DATA in the second line of FIG. 12). The filter 52 furthermore comprises r AND gates 82 each having an input connected to the input of a respective D flip-flop 80 and another input receiving a configuration bit. An OR gate 84 has r inputs linked to the r outputs of the AND gates 82. The output of the OR gate 84 is linked to the input of another D flip-flop 86. An AND gate 88 has an input linked to the output of the last flip-flop 80 of the shift register and its other input linked to the output of the flip-flop 86. The output of the AND gate 88 constitutes the output of the filter 52. The flip-flop 86 is set to the output of the OR gate 84 on the rising edge of a synchronization signal C which occurs when the r bits of the routing field are respectively present at the inputs of the flip-flops 80 (third line of FIG. 12).

The r configuration bits supplied to the AND gates 82 constitute a mask specific to the concentrator upstream of which the filter is stationed. In the final stage before an intermediate translation, each concentrator has a mask which includes a single configuration bit at 1: the one whose rank corresponds to the number of the intermediate module to which said concentrator is connected. For example, if r=16 in the case of FIG. 9, the concentrator numbered 1B is associated with the mask 0100000000000000. Every capsule having a 1 in the corresponding position in the routing field will thus be transmitted to the concentrator, with a delay of r bits as shown by the last line of FIG. 12. The other capsules are eliminated as not being destined for the outputs of the concentrator. The elimination consists in the AND gate 88 setting all the bits of the capsule to 0. The operation is the same for the preceding stages, the mask of each concentrator being defined as a logical OR of the masks associated with the concentrators situated downstream of said concentrator and connected thereto. For example, the mask associated with the concentrators numbered 2A and 2I in FIG. 9 is 1100000000000000, that associated with the concentrators 2F and 2N is 0000000000110000.

The mask is common to all the filters 52 of a bank stationed upstream of a given concentrator. It may for example be supplied simply by positioning switches provided on a board carrying both the concentrator and the filter bank. The synchronization signals C are common to all the filters of one and the same stage.

The filters 46 provided in the terminal matrices 36 upstream of the concentrators 38 may be of identical setup to that of the filters 52 illustrated by FIG. 11. The only difference is that each configuration bit of the mask designates an individual outgoing line and not an intermediate module.

It will be understood that other capsule structures, corresponding to different filter setups, could be adopted. The filters can for example be made simpler in return for more complex routing fields, by a method of "header consumption". In this method, the routing field is partially "consumed" by each filter along the path until it disappears completely, and at this moment a new translation must be performed. The bit Q then supplies the following translator with the information making it possible to distinguish the significant cells. In the previous routing method, the value of the routing field is reused for the concentrators of the stages situated between two translations. Now, each concentrator, making merely a binary decision, can be designed so as to test a single bit of the routing field, if this bit is dedicated to it. Moreover, on looking at the masks of various stages, it may be immediately deduced that the concentrators which end up at the same downstream submodule can share the same bit, since they have the same mask. Header consumption can therefore be accomplished by lengthening the routing field of the capsule as follows: taking the GSSC of FIG. 5 as an example, 8 bits must be reserved for the last stage, 4 more bits suffice for the second, and 2 bits suffice for the first stage. The bits of a stage can be consumed by the concentrators of the said stage, on condition that the bits for the first stage precede (in the direction of transmission) those of the second stage. Based on the structure of the network, it is easy to verify a general rule: routing with header consumption through a GSSC to r sub-modules requires $2+4+8 \ldots +r=2(r-1)$ bits in the initial routing field; routing through a switch having c GSSCs requires $2c(r-1)$ bits in the routing field, i.e. less than twice what is strictly necessary. In this alternative routing method, neither the mask nor the memory storage of the routing field are necessary in the filters, which may therefore be simplified. The filters associated with different concentrators are differentiated by the gating signals supplied to them.

In the two modes of routing set forth above, the filter banks 52 have the same structure irrespective of the concentrators with which they are associated. A stock unit made thus be defined, comprising a concentrator 50 and its associated filter bank and consituting a basic brick for constructing the switch allowing extensions of capacity without disturbance to traffic. Such a unit can be embodied on a single electronic board together with non-specific components, for realistic sizes of concentrator such as p=2, m=32.

Figure 13:
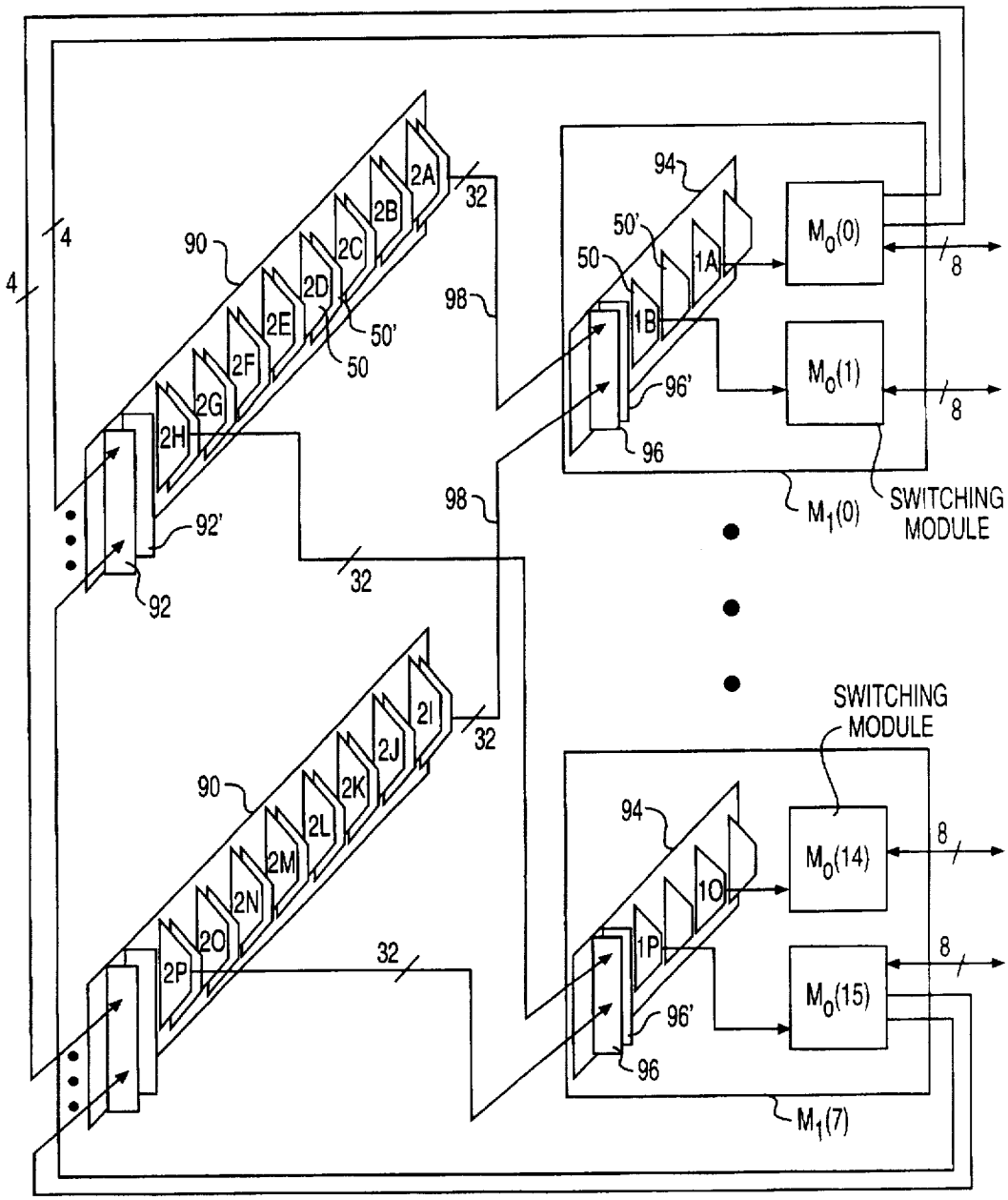
FIG. 13 is another representation of the ATM switch of FIG. 9.

FIG. 13 is another representation of the ATM switch of FIG. 9. This switch corresponds to c=4 modules $M_2$, comprising cN/p=8 modules $M_1$ and cN=16 modules $M_0$. FIG. 13 shows the whole of the first stage of the 4 GSSCs, which is split into two backplanes 90. Each backplane 90 includes buses for the passive broadcasting of the capsules to the filter banks (not represented) and the concentrators which it serves, this corresponding to the left-hand part of FIG. 9. The backplane furthermore distributes the clock and synchronization signals of use to the filters and to the elementary concentrators. The filter/concentrator units of the first stage are connected directly to the backplanes 90. Each of these units is duplicated (references 50 and 50') for security purposes. The backplanes 90 also include a reception board 92, into which are plugged the cables or optical fibres coming from the traffic equalizers of the modules $M_0$, and distributing the signals thus received to the broadcast buses. This reception board is also duplicated for security purposes (references 92 and 92'). A similar layout (backplane 94 with broadcast buses to which the duplicated concentrators 50 and 50' are connected, and duplicated reception boards 96 and 96') is provided for each module $M_1$. It is thus seen that the GSSCs may be constructed simply by slotting filtering and concentration boards into the passively prewired backplanes.

The homogeneity and simplicity of the GSSC fabric makes it possible to define security blocks of identical and very simple structure, and which are uncoupled from one another by passive backplanes. For example, the reception board 96 of the module $M_1(0)$, the concentrators 2A and 2I (and the associated filters), and the connection cables or fibres 98 carrying m=32 lines constitute a block which is duplicated for security (the duplication of the cables 98 is not drawn so as to ease the reading of the figure). These local security blocks enable the GSSCs to be extremely resistant to faults. In order for the quality of service to be affected, a security block must be faulty at the same time as its duplicate block, a very rare event bearing in mind the relatively small size of the security blocks and the multitude of them. The linewise switching matrices of the modules $M_0$ may be unduplicated. For security, it is nevertheless advantageous to duplicate the traffic equalizers 68 (in order to feed the duplicate reception boards 92, 92' of the backplanes of the first stage and together with them to constitute security blocks), and the reception boards of the modules $M_0$ including the intermediate translation elements 70 (in order to receive the duplicate streams from the concentrators of the last stage of the GSSCs and together with these concentrators to constitute security blocks).

If the GSSCs include more than two stages, there is cause, as compared with FIG. 13, to add a backplane, together with reception and concentration boards, for each GESS of the intermediate stages. A complete GESS thus represents p+1=3 electronic boards, or 2(p+1)=6 boards if duplication is provided.

An important advantage of the ATM switch according to the invention is that it may be equipped progressively without disturbing the traffic. We start from a given number of stages k, which makes it possible to fix the format of the capsules. We may have an initial configuration of c' GSSCs (c'≦c) each having N' groups of m output lines and at least N' groups of m input lines (N'≦N). The switch then admits N'c'n external two-way lines. If N'<N, each GSSC is underequipped.

Figure 14:
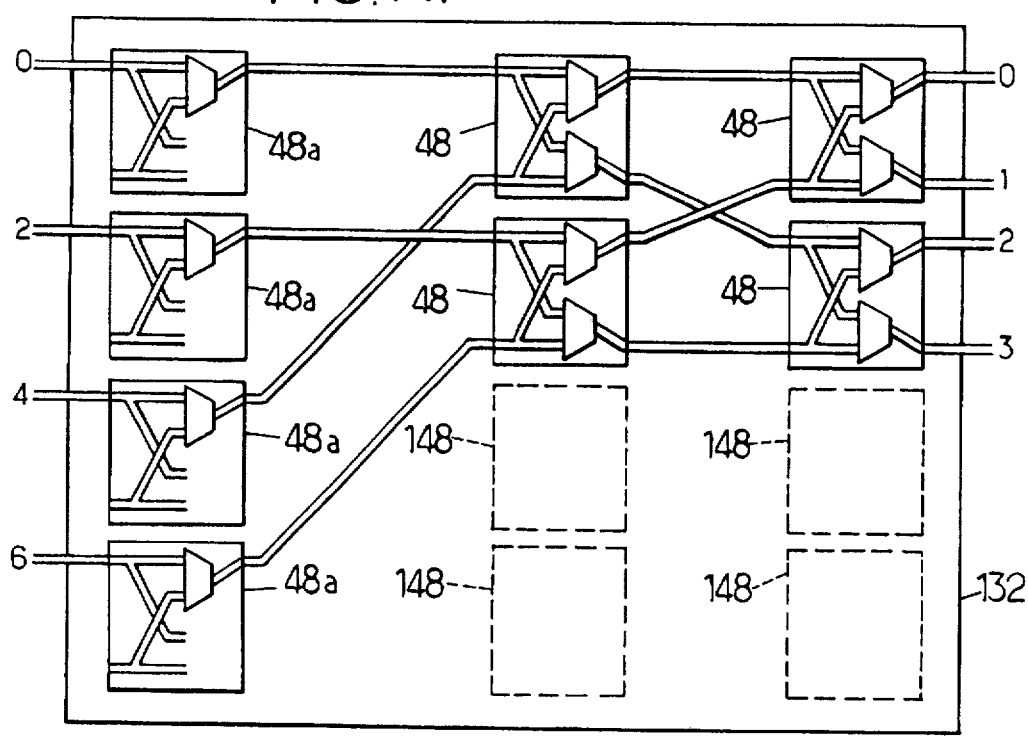
FIGS. 14 and 15 show incomplete versions of the GSSC represented in FIG. 5.

For example, FIG. 14 shows a GSSC 132 for which p=2 and k=3 (i.e. N=8) with N'=4. The eight elementary concentrators of the second and of the third stage form four complete GESSs 48. The four elementary concentrators of the first stage form four incomplete GESSs 48a each having one group of m outputs and one group of m inputs. In fact, the incomplete GESSs 48a of the first stage do not carry out any concentration, but serve merely to filter the capsules destined for the GESSs of the subsequent stages.

Figure 15:
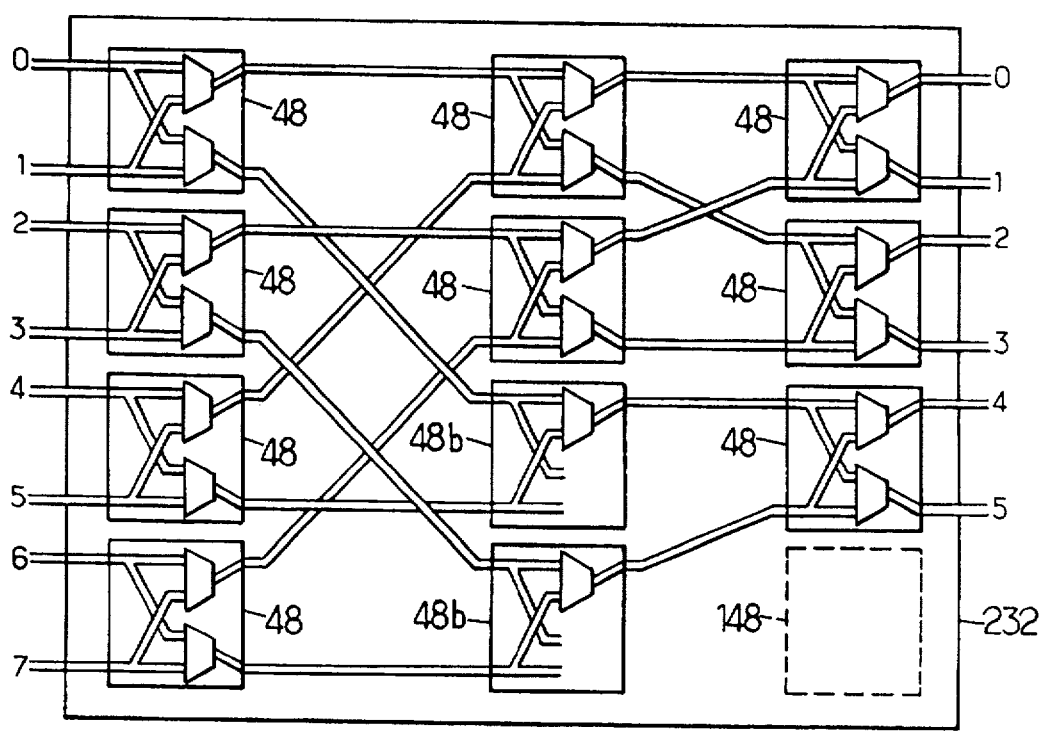

FIG. 15 shows an extended version 232 of the GSSC 132 of FIG. 14: the number of groups of output lines has gone from N'=4 to N'=6. The input traffic, corresponding to the throughput of N'=6 lines, is distributed by the equalizers over 8 input lines. The extension is effected by inserting 8 additional concentrators at appropriate locations. A complete GESS 48 has thus been inserted in the last stage for the output groups 4 and 5; the four GESSs 48 of the first stage have been completed; and another two concentrators have been added in the second stage to form two incomplete GESSs 48b with two groups of m inputs and one group of m outputs.

By inserting a further 4 concentrators at the remaining locations in the GSSC 232 of FIG. 15, a complete GSSC 32 is arrived at, represented in FIG. 5, for which N'=N=8.

Each GSSC can thus be made to grow as needs demand. If, initially, there is a number c' of GSSCs less than c=m/n, the ATM switch can moreover be made to grow by adding other GSSCs, this also being done without disturbance to traffic, by inserting concentration boards.

In certain cases, broadcast backplanes and their reception boards may also be installed progressively. The references 148 in FIGS. 14 and 15 show the vacant locations for receiving such planes.

By way of illustration, a capsule format is considered with reference to FIG. 10, having a 32-bit Ch_Routing field, a 24-bit A_Id field for the cells to be broadcast, a 10-bit LS_Id field and a 14-bit C_Id field for the point-to-point connections. This format presupposes the following technical options:

a maximum of 32 intermediate modules of 1024 lines (32,768 lines) may be identified with 10 bits of LS_Id and 32 bits in the routing field;

on account of the 32-bit routing field, each translation (initial or intermediate) allows routing to a set of 32 intermediate modules. Thus, together with a stage of intermediate translators, switches with a maximum of 1024 lines (32 modules of 32 lines) may be produced. In order to reach 32,768 lines, two intermediate translation stages must be set up.

up to 16384 point-to-point connections are allowed for each external line (the C_Id has 14 bits);

up to 16 million broadcast trees are allowed for a switch (the field A_Id has 24 bits). Of course, this number can be reduced in order to economize on the translation memories.

It remains to choose the parameters m, n, c (=m/n) q and p which characterize a concrete architecture. We take for example m=32, n=8, c=4, p=2 and q=8. To simplify the problem of control, the traffic equalizer and the intermediate translator can be placed within the modules $M_0$ as shown by FIG. 9. In this case, the terminal filters 46 work on 8 bits only. The same components can then be used to construct the following non-blocking switches:

a family of switches with a maximum size of 32×32 lines, by means of four directly interconnected 8-line $M_0$ modules. For this family, neither the GSSCs nor the intermediate translators nor the traffic equalizers are necessary, the initial translator being able to supply a sufficient routing field of 32 bits directly;

a family of switches with a maximum size of 64×64 lines, with k=1 concentration stage. In this case, the traffic equalizers serve no purpose. The intermediate translators and the initial translators each generate 8 bits of the routing field;

a family of switches with a maximum size of 128×128 lines (the case of FIGS. 9 and 13). In this case, four lines coming from a module $M_0$ can be multiplexed together to go to the first stages of the GSSCs, since $y=q/p^{k-1}=4$ (cf. FIG. 7). The initial translator generates 16 bits of the routing field;

a family of switches with a maximum size of 256×256 lines by using an additional stage of concentrators in the GSSCs. The initial translator fills the 32 bits of the routing field. Two lines connecting a module $M_0$ and the GSSCs can be multiplexed, since $y=q/p^{k-1}=2$ in this case.

The way in which to proceed further starting from this architecture may be seen: in the case of FIG. 9, the intermediate translators 70 generating just 8 bits are underutilized. By moving them from the modules $M_0$ to the modules of type $M_2$ (i.e. ahead of the last two concentration stages), it will be possible to generate the 32 routing bits in respect of the filtering in the line front ends. It is then possible to construct:

a family of switches with a maximum size of 512×512 lines (k=4). Now a single line links a module $M_0$ and each concentrator of a GSSC in the distribution plan to the GSSCs. The switch remains strictly non-blocking;

a family of switches with a maximum size of 1024×1024 lines (k=5). They will no longer be non-blocking (unless the size q of the equalizers is increased). However, partial equalization is achieved as explained with reference to FIG. 8. The blocking rate remains extremely low.

To estimate the cost of each extension, it may be observed that the assumptions used in this example require rather undemanding technology achievable with ordinary non-specific electronic components. It may be roughly estimated that 2.5 electronic boards are required per line in a module $M_0$ (translations and transmission included) and 1 board is required per concentrator, filtering included. To this must be added 1 auxiliary reception board for p=2 concentration boards in the GESSs. With the aid of FIGS. 5 and 9 it can be seen immediately that each concentration stage adds 1.5 boards for 8 external lines. The GSSCs include, at their maximum capacity, a total of ckN elementary concentrators, namely k/n per external line. Thus, for example, the fairly large configuration of 512×512 requires just 3.25 boards per external line. This figure is of the order of 4 boards when the network is duplicated in order to improve the resistance to faults. Such a switch can be housed in a room of around 30 $m^2$, estimating the floor space of an 80-board cabinet at 1 $m^2$.

With the same basic bricks and an additional translation stage, the architecture can be extended up to 32,678 lines before encountering the limit of the chosen internal transmission format. Such a switch preferably calls upon a denser degree of integration, for example: a 128 to 64 concentrator board, 64×32 matrices with one board per line front end, a 32×32 traffic equalization, and a stock internal transmission of 4 multiplexed lines. This is quite realistic with the current technology of application-specific integrated circuits (ASICs). Such a network is non-blocking up to the size of 1024×1024, and the blocking rate is completely negligible above this size. A rough estimate similar to that given above shows that there are then less than 2 boards per external line in total, line front ends and network duplication included. This would correspond to a floor space of around 800 $m^2$ for a 32768×32768 switch.

Figure 16:
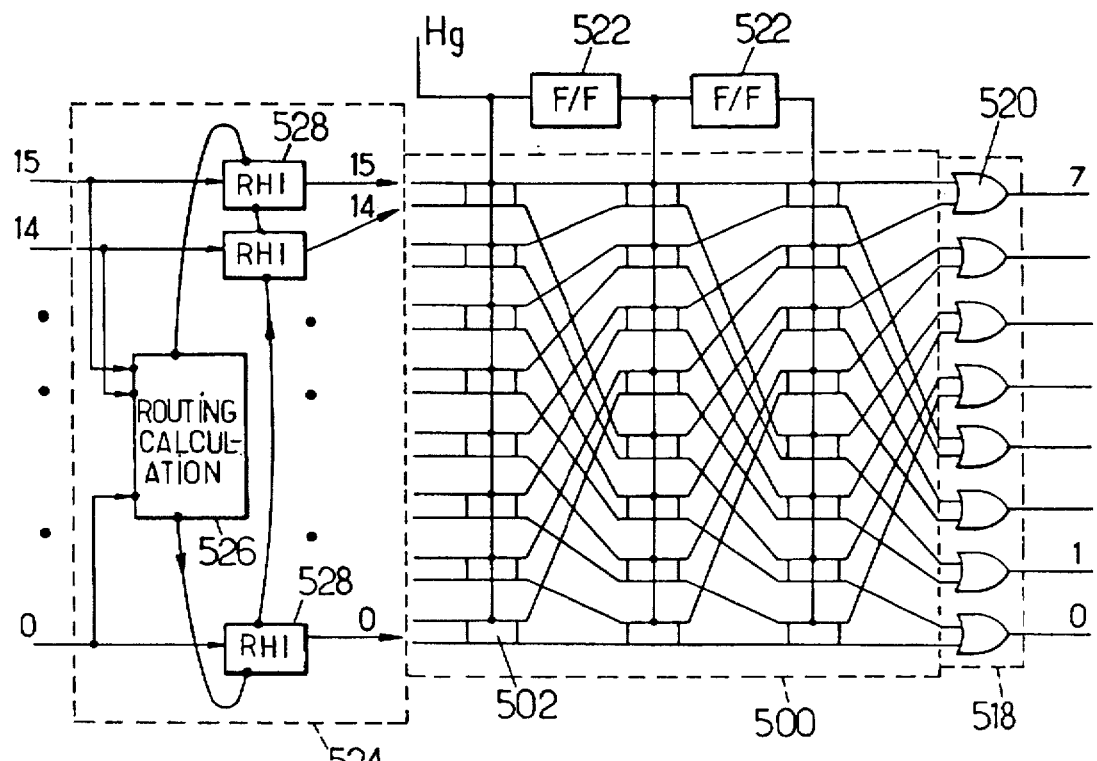
FIG. 16 is a diagram of a first exemplary embodiment of a concentrator usable in an ATM switch according to the invention.

FIG. 16 shows an exemplary concentrator with $2^K$ inputs and $2^L$ outputs which can be used as an elementary concentrator 50 in the GSSCs 32 or as a concentrator 38 in the linewise switching matrices 36. FIG. 16 corresponds to the case K=4, L=3, namely a concentration factor of $2^{K-L}=2$. It comprises an reverse Omega network 500 with $2^K$ inputs and L stages.

A reverse Omega network with $2^K$ inputs and L stages (L≦K) consists of a matrix of $2^{K-1}$ rows and L columns of binary switching elements 502, with two inputs and two outputs, which are interconnected according to the following law (assuming that the inputs and outputs of each column are numbered from i=0 to i=$2^K$–1 from the bottom to the top of the column):

the $2^K$ inputs of column 0 constitute the $2^K$ ordered inputs of the network;

output i of column j−1 is linked to the input Rrot(i) of column j, for 0≦i≦$2^K$−1 and 1≦j≦L−1;

output i of column L−1 constitutes the output Rrot(i) of the network, for 0≦i≦$2^K$−1;

i lying between 0 and $2^K$−1 is represented by K bits with base 2, and the notation Rrot(i) used above denotes the number lying between 0 and $2^K$−1 whose binary representation corresponds to the K bits representing i, subjected to a circular permutation of one position to the right. For example with K=4 and i=12=[1100]$_2$, we have Rrot(i)= [0110]$_2$=6. Each stage of the reverse Omega network consists of a column of $2^K$−1 binary switching elements 502 and of the interconnection pattern situated downstream towards the next column.

Figure 17:
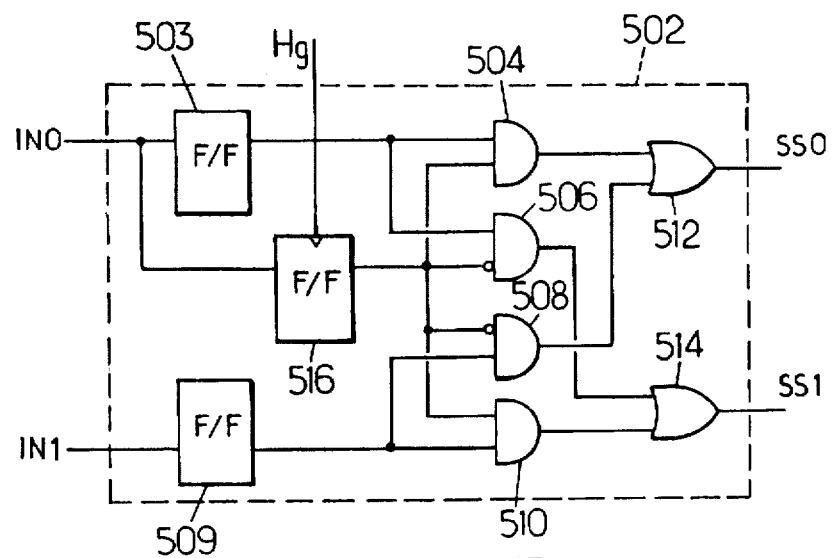
FIG. 17 is a diagram of a binary switching element of the concentrator of FIG. 16.

The binary switching element 502 is for example in accordance with the diagram of FIG. 17. The upper input IN0 and lower input IN1 are each linked to an input of a respective D flip-flop 503, 509 gated by the bit clock in order to introduce a delay of one bit time. The output of the flip-flop 503 is linked to an input of two AND gates 504, 506. The output of the flip-flop 509 is linked to an input of two AND gates 508, 510. An OR gate 512 has two inputs respectively linked to the outputs of the AND gates 504 and 508 and an output constituting the upper output SS0 of the element 502. An OR gate 514 has two inputs respectively linked to the outputs of the AND gates 506 and 510, and an output constituting the lower output SS1 of the element 502. The element 502 furthermore includes a D flip-flop 516 gated by a signal Hg, whose D input is linked to the upper input IN0 of the element 502. The second inputs of the AND gates 504 and 510 are each linked to the Q output of the flip-flop 516 as are the second inputs of the AND gates 506 and 508, which are inverting.

The reverse Omega network 500 of FIG. 16 is followed by K−L=1 concentration stage 518 having a concentration ratio of 2/1. The concentration stage 518 is composed of $2^L$ OR gates 520 laid out in a column. Each OR gate 520 has two inputs respectively linked to two consecutive outputs of the reverse Omega network. In order to generalize the concentrator to the case where K−L>1, K−L successive concentration stages are to be provided downstream of a reverse Omega network with K stages, the j'-th concentration stage ($1 \leq j' \leq K-L$) including $2^{K-j'}$ OR gates laid out in a column and having two inputs respectively linked to two consecutive outputs of the preceding stage. In other words, the output i of the j'-th concentration stage ($1 \leq j' \leq K-L$ and $0 \leq i \leq 2^{K-j'}-1$) is provided by an OR gate whose two inputs are linked to the outputs $2i$ and $2i+1$ of the preceding stage.

Each capsule arriving at an input of the reverse Omega network 500 includes a header of L bits at least. This header, which is distinct from the routing field described earlier, is placed at the start of the capsule format. The (j+1)-th bit b(j) of the header ($0 \leq j-L \leq 1$) is intended to control the switching in the binary switching elements of column j of the reverse Omega network, so as to route the capsule to the upper output SS0 when b(j)=1 and to the lower output SS1 when b(j)=0. This switching is achieved by sending to the elements 502 of column j a gating signal Hg adjusted so as to allow storage of the bit b(j) in the flip-flop 516 over the duration of transit of a capsule. D flip-flops 522 gated by the bit clock transmit the signal Hg to the binary elements 502 of the various stages. A priori, a conflict may occur in a binary switching element 502 if two capsules arrive simultaneously on its two inputs IN0 and IN1 with identical routing bits b(j).

Routing logic 524 is provided upstream of the network 500 in order to generate the routing bits b(j) for the various capsules in such a way as to avoid such conflicts arising.

The reverse Omega networks have the property of being self-routing, i.e. the L routing bits b(L-1), . . . , b(0) considered in the inverse order of the columns are the binary representation of the output address, i.e. of the number of that output of the concentrator to which the capsule will be routed.

A routing algorithm which eliminates conflicts has been set out in the document FR-A-2 678 794. This algorithm consists in allocating to the idle (or free or empty) capsules an output address resulting from the decrementation of a first counting variable with the arrival of each idle capsule, and in allocating to the busy (or occupied or active) capsules an output address resulting from the incrementation of a second counting variable with the arrival of each busy capsule. This ensures a routing of the idle capsules in the descending circular direction of the outputs, and a routing of the busy capsules in the rising circular direction of the outputs, without any risk of conflict in the reverse Omega network. When L<K, it is possible that more than $2^L$ cells may arrive simultaneously at the input, something which does not provoke any conflict in the L stages of the reverse Omega network but may provoke collisions in the OR gates of the concentration stages. To avoid such collisions, the algorithm provides for the setting to zero of any capsules in excess of $2^L$. Such a setting to zero causes the loss of the capsule; but the probability of such a loss is very low for realistic dimensionings of the concentrators, as explained earlier.

This routing algorithm is implemented by a routing calculation unit 526 of the routing logic 524. The headers are inserted at the start of each capsule by routing header insertion (RHI) elements 528 provided at each input of the concentrator. An optimal hardware embodiment of the routing logic 524 is described in French Patent Application 2 721 416 and in the corresponding U.S. patent application Ser. No. 08/491,075 which is incorporated herein by reference.

The concentrator of FIG. 16 furthermore ensures a function of equalization of the traffic on its outputs. It will be observed that this function serves no purpose in the elementary concentrators of the GSSCs.

Figure 18:
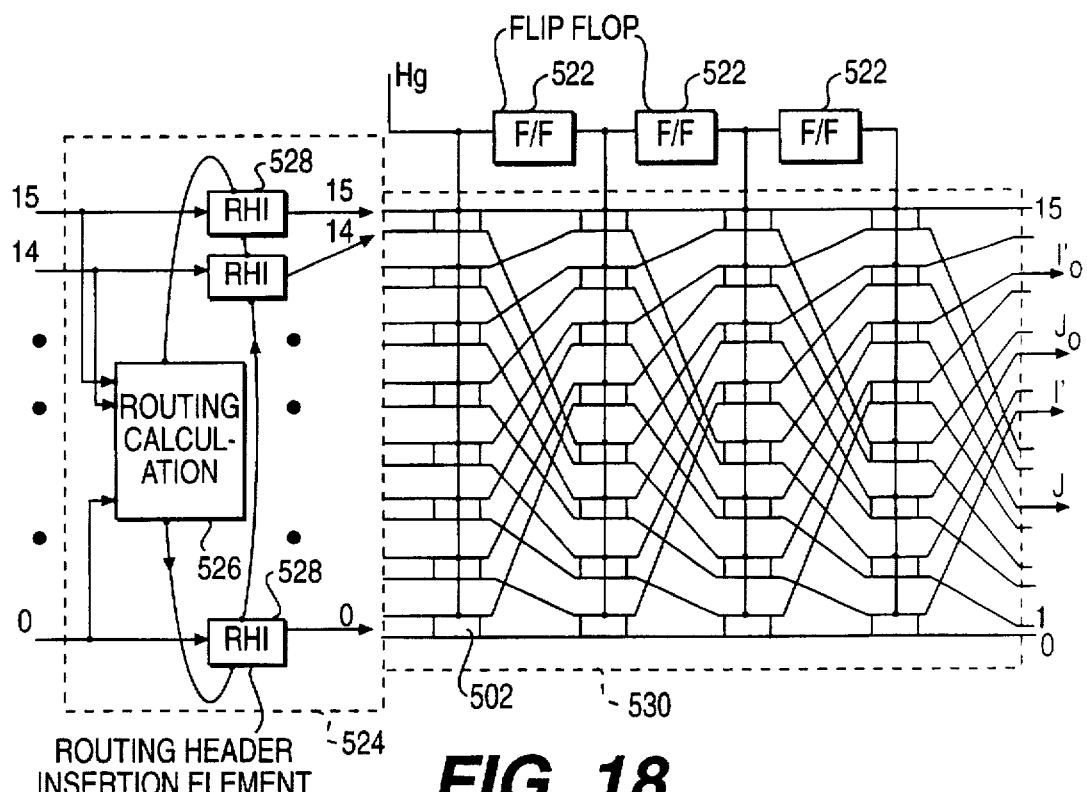
FIG. 18 shows a traffic equalizer usable in an ATM switch according to the invention.

When K=L, i.e. in the absence of concentration stages downstream of the K-stage reverse Omega network, it does not act as a concentrator, but simply as a traffic equalizer. The same design may therefore be used to embody the traffic equalizers stationed upstream of the GSSCs. FIG. 18 thus shows a traffic equalizer for which K=L=4 and which therefore equalizes the traffic of q=16 lines. The reference numerals used are the same as in FIG. 16 for corresponding elements. The difference is that the stage of OR gates 518 is replaced by the K-th stage of the reverse Omega network 530.

It is noted that the routing algorithm set forth above accepts a free variable which is the initial output address on the basis of which the output addresses of the busy capsules are allocated according to the rising circular direction and those of the idle capsules are allocated in the reverse direction. In each capsule time the initial address is changed in such a way that the capsules are distributed in a circular succession over all the outputs. Through the fact that the number of capsules present on each occasion is random, the load of each ATM connection is uniformly statistically distributed.

If, with a fairly long period as compared with a capsule time, a new initial address is reimposed, this regular distribution is not disturbed. This makes it possible to send test capsules along deterministic paths through the network consisting of the traffic equalizers and the GSSCs, for the purpose of locating the network defects. Let us assume that the test capsule is to enter at position I and leave at position I' (FIG. 18). After the first calculation loop, starting from an arbitrary initial address $J_0$, has given the output address $I'_0$ corresponding to I, the routing calculation loop is re-executed with the initial value $J=J_0+I'-I'_0$, so as to obtain the required output address I' for the input I, since $J-I'=J_0-I'_0$.

Figure 19:
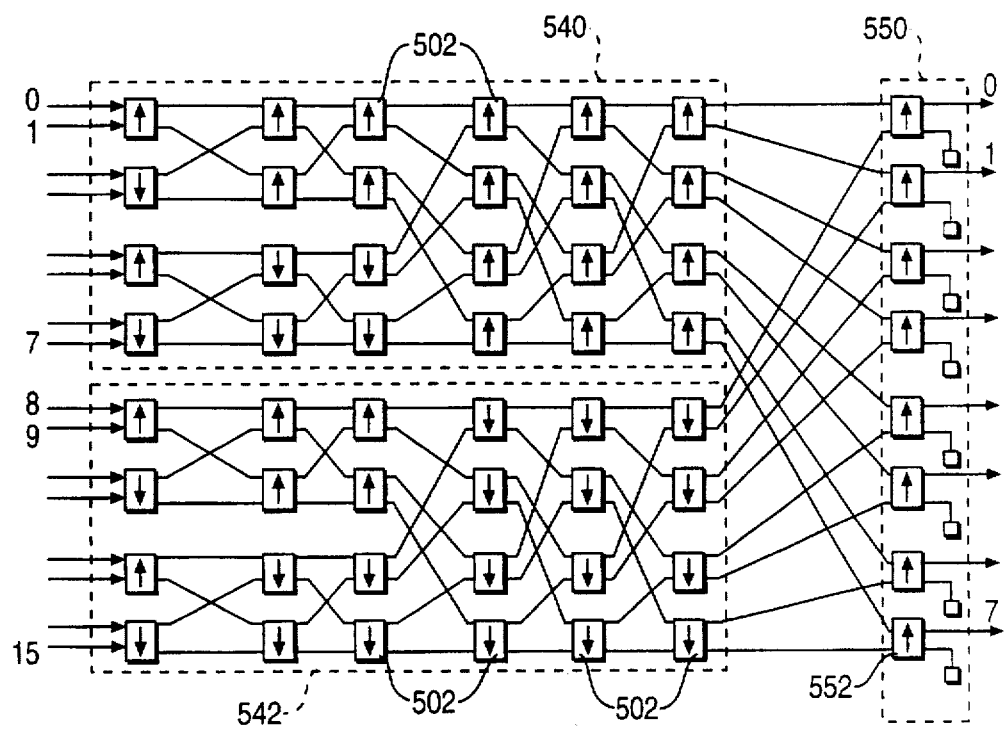
FIG. 19 is a diagram of a second exemplary embodiment of a concentrator usable in an ATM switch according to the invention.

FIG. 19 shows another possible setup of a concentrator usable in the GSSCs or in the linewise switching matrices. The concentrator represented has $2^K=16$ inputs and $2^L=8$ outputs as in the case of FIG. 16. It comprises two sorting networks 540, 542 which each sort over $2^{K-1}=8$ lines on the basis of the activity bits Q of the capsules. The bit Q is then preferably placed in first position in the capsule format. The sorting network 540 has its inputs linked to the inputs 0 to $2^{K-1}-1=7$ of the concentrator, and it sorts the capsules in decreasing order of the bits Q, i.e. the busy capsules (Q=1) are forwarded to the upper outputs of the network 540 in FIG. 19 whereas the idle cells (Q=0) are forwarded to the lower outputs. The sorting network 542 has its inputs linked to the inputs $2^{K-1}=8$ to $2^K-1=15$ of the concentrator, and it sorts the capsules in increasing order of the bits Q. Considering the outputs of the two sorting networks 540, 542 from top to bottom of FIG. 19, the bits Q therefore constitute two monotonic sequences which, in the example represented are respectively decreasing and increasing.

In the case represented in FIG. 19, the sorting networks 540, 542 are "bitonic" type Batcher networks (see the article "Sorting Networks and Their Applications", by K. E. Batcher, AFIPS Proc. 1968, Spring Joint Computer Conf., Vol 32; pages 307–314). They each consist of $K(K-1)/2=6$ stages of $2^{K-2}=4$ binary comparison elements 502. The binary elements 502 represented in FIG. 19 with an upward pointing arrow are in accordance with that of FIG. 17. The comparison elements 502 represented in FIG. 19 with a downward pointing arrow are identical except that it is the output of the OR gate 514 which constitutes the upper output SS0 whereas the output of the OR gate 512 constitutes the lower output SS1. The gating signal Hg sent to the flip-flop 516 is here adjusted so as to store in this flip-flop the value of the activity bit Q indicating whether the capsule arriving on the input connected to the flip-flop 516 is idle (Q=0) or busy (Q=1) for the duration of transit of the capsule. Thus, the output SS0 of each element 502 always receives a capsule whose activity bit Q has a value equal to or greater than that of the activity bit of the capsule sent to the output SS1.

With reference to FIG. 19, the sorting networks 540, 542 are followed by K–L=1 concentration stage 550 having a concentration ratio of 2/1. The concentration stage 550 is composed of $2^L$ comparison elements 552 essentially identical to the elements 502 represented with an upward pointing arrow. The capsules leaving these elements 552 on the lower outputs SS1 are eliminated (in accordance with FIG. 17, it is seen therefore that the multiplexer consisting of the gates 506, 510 and 514 can be omitted from these elements 552). Thus, the single output SS0 of the element 552 receives a busy capsule (Q=1) as soon as at least one busy capsule arrives on its two inputs. If two idle capsules arrive simultaneously on its two inputs, the element 552 routes the one arriving on the input IN1 to its output SS0. In order to generalize the concentrator to the case where K–L>1, there are provided K–L successive concentration stages downstream of the sorting networks 540, 542. The j'-th concentration stage ($i \leq j' \leq K-L$) then includes $2^{K-j'}$ comparison elements 552, the element i ($0 \leq i \leq 2^{K-j'}$) of the j'-th concentration stage having its two inputs respectively linked to the outputs i and $i+2^{K-j'}$ of the preceding stage, and its output constituting the output i of stage j'. In the case of the first concentration stage 550, element i receives the (i+1)-th largest value among the bits Q sorted by the network 540 and the (i+1)-th smallest value among the bits Q sorted by the network 542. The properties of the "bitonic" sequences, demonstrated by Batcher, then ensure that the j'-th concentration stage always forwards the $2^{K-j'}$ largest values of the bits Q supplied to the input. A concentration of $2^K$ inputs to $2^L$ outputs, with elimination of any capsules in excess of $2^L$, is thus indeed achieved.

In order to achieve a concentration factor equal to $2^{K-L}$ starting from $2^K$ inputs, a concentrator according to FIG. 19 uses $K(K-1).2^{K-2}$ elements 502 and $2^K-2^L$ elements 552, instead of $L.2^{K-1}$ elements 502 and $2^K-2^L$ OR gates 520 for a concentrator according to FIG. 16. However, the concentrator of FIG. 19 makes it possible not to have to undertake a routing calculation.

In the two cases, the embodying of a concentrator of up to 128×64 in an application-specific integrated circuit presents no particular difficulty in the current state of the art. By using non-specific components, such a device can be embodied as an electronic board.

I claim:

1. ATM switch having N'c'n incoming lines and N'c'n outgoing lines, comprising: N'c' linewise switching matrices; and a synchronous interconnection network comprising c' groupwise synchronous switching cores each having k successive stages of groupwise elementary synchronous switches from a first stage to a last stage, N',c',n and k being integers greater than 0, wherein each one of the c' groupwise synchronous switching cores has N' groups of m outputs and at least N'm inputs, m being an integer such that $m \geq 2$ and $c' \leq m/n$, wherein the inputs of each groupwise synchronous switching core receive synchronously ATM cells arriving on the N'c'n' incoming lines of the ATM switch, wherein each one of the N'c' linewise switching matrices has m inputs respectively connected the outputs of a respective one of the groups of m outputs of one of the c' groupwise synchronous switching cores, and n outputs linked to respective ones of the N'c'n' outgoing lines of the ATM switch, wherein each groupwise elementary synchronous switch has at least one and at most p groups of m inputs and at least one and at most p groups of m outputs, p being an integer such that $p \geq 2$ and $N' \leq p^k$, wherein the inputs of each of the c' groupwise synchronous switching cores consist of the inputs of the groupwise elementary synchronous switches of the first stage thereof, while the outputs of each of the c' groupwise synchronous switching cores consist of the outputs of the groupwise elementary synchronous switches of the last stage thereof, wherein each groupwise elementary synchronous switch comprises at least one and at most p elementary concentrators each having pm inputs and m outputs, and a plurality of filters each associated with a respective input of an elementary concentrator of said groupwise elementary synchronous switch, each filter being arranged for eliminating ATM cells not destined for an output of said elementary concentrator, the m outputs of each of said elementary concentrators constituting a respective group of m outputs of said groupwise elementary synchronous switch, and each input of said groupwise elementary synchronous switch being linked to a respective input of each one of the elementary concentrators thereof through the filter associated therewith, and wherein, if k>1, each one of the c' groupwise synchronous switching cores further comprises groups of m lines, each linking a respective group of m outputs of a groupwise elementary synchronous switch of a stage of said groupwise synchronous switching core other than the last stage thereof to a respective group of m inputs of a groupwise elementary synchronous switch of a next stage of said groupwise synchronous switching core.

2. ATM switch according to claim 1, wherein $N'=p^k$, and the groupwise elementary synchronous switches of each groupwise synchronous switching core are interconnected as a k-stage Delta network of order p whose internal links consist of the groups of m lines.

3. ATM switch according to claim 1, wherein each groupwise elementary synchronous switch comprises a passive component for broadcasting ATM cells, at least one reception component for receiving groups of m lines and, for each elementary concentrator of said groupwise elementary synchronous switch, an active component connected to said passive component and including said concentrator and the filters associated with the pm inputs thereof.

4. ATM switch according to claim 3, comprising duplicated security blocks, each security block comprising a reception component of a respective groupwise elementary synchronous switch, the groups of m lines received by said reception component and the active components of the groupwise elementary synchronous switches of a preceding stage, whose elementary concentrators have their outputs linked to said groups of m lines.

5. ATM switch according to claim 3, wherein the reception component and the active components of a groupwise elementary synchronous switch consist of respective electronics boards connected to a backplane constituting said passive component.

6. ATM switch according to claim 1, further comprising initial routing data translation means receiving the ATM cells arriving on each incoming line, in order to encapsulate each cell into a capsule format which includes at least one routing field placed ahead of the cell for routing through the synchronous interconnection network.

7. ATM switch according to claim 6, further comprising at least one intermediate routing data translation stage placed immediately downstream of a stage of groupwise elementary synchronous switches, in order to regenerate the contents of the routing field of the capsules.

8. ATM switch according to claim 7, wherein the intermediate routing data translation stage comprises intermediate translation elements respectively associated with intermediate modules, an intermediate module consisting of the linewise switching matrices and/or the groupwise elementary synchronous switches placed downstream of said intermediate translation stage and connected to a respective one of said intermediate translation elements, wherein the routing field generated by the initial translation means includes a bit specific to each intermediate module indicating whether the capsule is to be transmitted to said intermediate module, and wherein each intermediate translation element regenerates the routing field in such a way as to ensure routing through the intermediate module associated therewith.

9. ATM switch according to claim 6, wherein, for an ATM cell to be broadcast to several outgoing lines, the capsule format includes a field identifying a broadcasting tree.

10. ATM switch according to claim 6, wherein, for an ATM cell transmitted in point-to-point connection mode, the capsule format includes a field identifying a destination outgoing line and a field identifying a point-to-point connection established to said outgoing line.

11. ATM switch according to claim 1, further comprising means for equalizing the trafic on inputs of the groupwise synchronous switching cores.

12. ATM switch according to claim 11, wherein the equalizing means are designed to equalize the traffic received by the various groupwise elementary synchronous switches of the first stages of the groupwise synchronous switching cores.

13. ATM switch according to claim 11, wherein the groupwise elementary synchronous switches of the first stages of the groupwise synchronous switching cores form several sets, and wherein the equalizing means are designed to equalize the traffic received by the various groupwise elementary synchronous switches of each of said sets.

14. ATM switch according to claim 11, wherein the equalizing means comprise traffic equalizers each having $2^K$ inputs linked to $2^K$ incoming lines of the ATM switch, and $2^K$ outputs linked to respective inputs of the groupwise synchronous switching cores, K being an integer, wherein each traffic equalizer comprises a K-stage reverse Omega network and routing logic for detecting idle and busy ATM cells simultaneously arriving on the $2^K$ inputs of the equalizer, in order to route the idle cells through the reverse Omega network to selected outputs in one circular direction, and in order to route the busy cells through the reverse Omega network to selected outputs in the opposite circular direction.

15. ATM switch according to claim 1, wherein each linewise switching matrix comprises, for each one of its n outputs: a terminal concentrator with m inputs and m' outputs; m' queues each linked to a respective output of said terminal concentrator; and reading means for transferring in succession the contents of the m' queues to said output of the matrix, m' being an integer smaller than m, each input of each terminal concentrator being linked to a respective input of said linewise switching matrix through a filter for eliminating the ATM cells not destined for the corresponding output of the matrix.

16. ATM switch according to claim 15, wherein the integers m and m' are respectively of the form $2^K$ and $2^L$ with K>L, and wherein each of said terminal concentrators comprises a reverse Omega network with $2^K$ inputs and L stages followed by K–L successive concentration stages, the j'-th concentration stage comprising $2^{K-j'}$ OR gates each having two inputs respectively linked to two consecutive outputs of the preceding stage, for $1 \leq j' \leq K-L$, and routing logic for detecting idle and busy ATM cells simultaneously arriving on the $2^K$ inputs of the concentrator, in order to route the idle cells through the reverse Omega network and the concentration stages to selected outputs in one circular direction, and in order to route the busy cells through the reverse Omega network and the concentration stages to selected outputs in the opposite circular direction.

17. ATM switch according to claim 15, wherein the integers m and m' are respectively of the form $2^K$ and $2^L$ with K>L, wherein each of said terminal concentrators comprises two sorting networks each having $2^{K-1}$ inputs and $2^{K-1}$ outputs and each sorting ATM cells simultaneously arriving at the $2^{K-1}$ inputs thereof on the basis of activity bits each indicating whether a respective one of said cells is idle or busy, said sorting of the ATM cells being such that the activity bits of the sorted cells form two respective monotonic sequences at the output of the sorting networks, wherein the sorting networks are followed by K–L successive concentration stages, the first concentration stage including $2^{K-1}$ comparison elements, the comparison element i ($0 \leq i < 2^{K-1}$) of the first concentration stage having a first input receiving the ATM cell whose activity bit has the (i+1)-th largest value of one of the monotonic sequences and a second input receiving the ATM cell whose activity bit has the (i+1)-th smallest value of the other monotonic sequence, wherein, if K–L>1, the j'-th concentration stage ($1 < j' \leq K-L$) includes $2^{K-j'}$ comparison elements, the comparison element i ($0 \leq i < 2^{K-j'}$) of the j'-th concentration stage having two inputs respectively linked to the outputs of the comparison elements i and $i+2^{K-j'}$ of the (j'–1)-th concentration stage, and wherein each comparison element of a concentration stage routes to its output a busy ATM cell if it receives at least one busy ATM cell on one of its two inputs, and an idle ATM cell if it receives no busy ATM cell on its two inputs.

18. ATM switch according to claim 1, wherein the integers m and p are respectively of the form $2^L$ and $2^{K-L}$, and wherein each of said elementary concentrators comprises a reverse Omega network with $2^K$ inputs and L stages followed by K–L successive concentration stages, the j'-th concentration stage comprising $2^{K-j'}$ OR gates each having two inputs respectively linked to two consecutive outputs of the preceding stage, for $1 \leq j' \leq K-L$, and routing logic for detecting idle and busy ATM cells simultaneously arriving on the $2^K$ inputs of the concentrator, in order to route the idle cells through the reverse Omega network and the concentration stages to selected outputs in one circular direction, and in order to route the busy cells through the reverse Omega network and the concentration stages to selected outputs in the opposite circular direction.

19. ATM switch according to claim 1, wherein the integers m and p are respectively of the form $2^L$ and $2^{K-L}$, wherein each of said elementary concentrators comprises two sorting networks each having $2^{K-1}$ inputs and $2^{K-1}$ outputs and each sorting ATM cells simultaneously arriving at the $2^{K-1}$ inputs thereof on the basis of activity bits each indicating whether a respective one of said cells is idle or busy, said sorting of the ATM cells being that the activity bits of the sorted cells form two respective monotonic sequences at the output of the sorting networks, wherein the sorting networks are followed by K–L successive concentration stages, the first concentration stage including $2^{K-1}$ comparison elements, the comparison element i ($0 \leq i \leq 2^{K-1}$) of the first concentration stage having a first input receiving the ATM cell whose activity bit has the (i+1)-th largest value of one of the monotonic sequences and a second input receiving the ATM cell whose activity bit has the (i+1)-th smallest value of the other monotonic sequence, wherein, if K–L>1, the j'-th concentration stage ($1<j' \leq K-L$) includes $2^{K-j'}$ comparison elements, the comparison element i ($0 \leq i > 2^{K-j'}$) of the j'-th concentration stage having two inputs respectively linked to the outputs of the comparison elements i and $i+2^{K-j'}$ of the (j'–1)-th concentration stage, and wherein each comparison element of a concentration stage routes to its output a busy ATM cell if it receives at least one busy ATM cell on one of its two inputs, and an idle ATM cell if it receives no busy ATM cell on its two inputs.

20. Groupwise synchronous switching core comprising: N' groups of m outputs; at least N'm inputs synchronously receiving ATM cells; and k successive stages of groupwise elementary synchronous switches from a first stage to a last stage, N', m and k being integers with $N' \geq 2$ and $m \geq 2$, wherein each groupwise elementary synchronous switch has at least one and at most p groups of m inputs and at least one and at most p groups of m outputs, p being an integer such that $p \geq 2$ and $N' \leq p^k$, wherein each groupwise elementary synchronous switch includes at least one and at most p elementary concentrators each having pm inputs and m outputs, and a plurality of filters each associated with a respective input of an elementary concentrator of said groupwise elementary synchronous switch, each filter being arranged for eliminating ATM cells not destined for an output of said elementary concentrator, the m outputs of each elementary concentrator constituting a respective group of m outputs of said groupwise elementary synchronous switch, and each input of said groupwise elementary synchronous switch being linked to a respective input of each one of the elementary concentrators thereof through the filter associated therewith, the groupwise synchronous switching core further comprising, if k>1, groups of m lines, each linking a respective group of m outputs of a groupwise elementary synchronous switch of a stage other than the last stage to a respective group of m inputs of a groupwise elementary synchronous switch of a next stage.

21. Groupwise synchronous switching core according to claim 20, wherein $N'=p^k$, and the groupwise elementary synchronous switches are interconnected as a k-stage Delta network of order p whose internal links consist of groups of m lines.

22. Groupwise synchronous switching core according to claim 20, wherein each groupwise elementary synchronous switch comprises a passive component for broadcasting ATM cells, at least one reception component for receiving groups of m lines and, for each elementary concentrator of said groupwise elementary synchronous switch, an active component connected to said passive component and including said concentrator and the filters associated with the pm inputs thereof.

23. Groupwise synchronous switching core according to claim 22, comprising duplicated security blocks, each security block comprising a reception component of a respective groupwise elementary synchronous switch, the groups of m lines, received by said reception component and the active components of the groupwise elementary synchronous switches of a preceding stage, whose elementary concentrators have their outputs respectively linked to said groups of m lines.

24. Groupwise synchronous switching core according to claim 22, wherein the reception component and the active components of a groupwise elementary synchronous switch consist of respective electronic boards connected to a backplane constituting said passive component.

25. Groupwise synchronous switching core according to claim 20, wherein the integers m and p are respectively of the form $2^L$ and $2^{K-L}$, and wherein each of said elementary concentrators comprises a reverse Omega network with $2^K$ inputs and L stages followed by K–L successive concentration stages, the J'-th concentration stage comprising $2^{K-j'}$ OR gates each having two inputs respectively linked to two consecutive outputs of the preceding stage, for $1 \leq j' \leq K-L$, and routing logic for detecting idle and busy ATM cells simultaneously arriving on the $2^K$ inputs of the elementary concentrator, in order to route the idle cells through the reverse Omega network and the concentration stages to selected outputs in one circular direction stages to selected outputs in one circular direction, and in order to route the busy cells through the reverse Omega network and the concentration stages to selected outputs in the opposite circular direction.

26. Groupwise synchronous switching core according to claim 20, wherein the integers m and p are respectively of the form $2^L$ and $2^{K-L}$, wherein each of said elementary concentrators comprises two sorting networks each having $2^{K-1}$ inputs and $2^{K-1}$ outputs and each sorting ATM cells simultaneously arriving at the $2^{K-1}$ inputs thereof on the basis of activity bits each indicating whether a respective one of said cells is idle or busy, said sorting of the ATM cells being such that the activity bits of the sorted cells form two respective monotonic sequences at the output of the sorting networks, wherein the sorting networks are followed by K–L successive concentration stages, the first concentration stage including $2^{K-1}$ comparison elements, the comparison element i ($0 \leq i < 2^{K-1}$) of the first concentration stage having a first input receiving the ATM cell whose activity bit has the (i+1)-th largest value of one of the monotonic sequences and a second input receiving the ATM cell whose activity bit has the (i+1)-th smallest value of the other monotonic sequence, wherein, if K–L>1, the j'-th concentration stage ($1<j' \leq K-L$) includes $2^{K-j'}$ comparison elements, the comparison element i ($0 \leq i < 2^{K-j'}$) of the j'-th concentration stage having two inputs respectively linked to the outputs of the comparison elements i and $i+2^{K-j'}$ of the (j'–1)-th concentration stage, and wherein each comparison element of a concentration stage routes to its output a busy ATM cell if it receives at least one busy ATM cell on one of its two inputs, and an idle ATM cell if it receives no busy ATM cell on its two inputs.

* * * * *